US011392847B1

(12) United States Patent
Abdollahian et al.

(10) Patent No.: US 11,392,847 B1
(45) Date of Patent: Jul. 19, 2022

(54) EARLY WARNING AND EVENT PREDICTING SYSTEMS AND METHODS FOR PREDICTING FUTURE EVENTS

(71) Applicant: Acertas LLC, Claremont, CA (US)

(72) Inventors: Mark Abdollahian, Altadena, CA (US); Zhengming Song, Houston, TX (US); Domrongphol Sangmanee, Bangkok (TH); Khaled Eid, Claremont, CA (US); Yadong Ruan, Upland, CA (US); Qiao Yang, Upland, CA (US); Yanbiao Chen, Upland, CA (US); Linfeng Li, Pomona, CA (US); Qiyun Li, Montclair, CA (US); Jacek Kugler, Claremont, CA (US)

(73) Assignee: ACERTAS, LLC, Claremont, CA (US)

(\*) Notice: Subject to any disclaimer, the term of this patent is extended or adjusted under 35 U.S.C. 154(b) by 0 days.

(21) Appl. No.: 17/229,297

(22) Filed: Apr. 13, 2021

Related U.S. Application Data

(60) Provisional application No. 63/009,252, filed on Apr. 13, 2020.

(51) Int. Cl.
*G06N 7/00* (2006.01)
*G06N 20/00* (2019.01)

(52) U.S. Cl.
CPC .............. *G06N 7/005* (2013.01); *G06N 20/00* (2019.01)

(58) Field of Classification Search
CPC ................................ G06N 7/005; G06N 20/00
See application file for complete search history.

(56) References Cited

U.S. PATENT DOCUMENTS

| | | | | |
|---|---|---|---|---|
| 2004/0083452 | A1* | 4/2004 | Minor ................... | G16B 50/20 717/109 |
| 2010/0211603 | A1* | 8/2010 | Bealing .................. | G06F 16/22 707/776 |
| 2016/0314528 | A1* | 10/2016 | Abbott .................. | G06N 5/022 |
| 2017/0185729 | A1* | 6/2017 | Boray ................... | G06N 20/00 |
| 2020/0209832 | A1* | 7/2020 | Behandish ............. | G06F 30/20 |
| 2021/0117869 | A1* | 4/2021 | Plumbley ............... | G06N 20/20 |

OTHER PUBLICATIONS

Phillips, Mark A., and Paavo Ritala. "A complex adaptive systems agenda for ecosystem research methodology." Technological Forecasting and Social Change 148 (2019): 119739. (Year: 2019).*

\* cited by examiner

*Primary Examiner* — Eric Nilsson
(74) *Attorney, Agent, or Firm* — Armstrong Teasdale LLP

(57) ABSTRACT

An early warning and event monitoring computer device for predicting events is provided. The computer device programmed to a) store a plurality of models associated with a plurality of future events, b) receive a plurality of data from a plurality of data sources, c) preprocess the plurality of data to remove noise and populate the plurality of models with the plurality of data, d determine a subset of models of the plurality of models to execute based on a user query, e) execute the subset of models to receive a plurality of results, f) ensemble the plurality of results from the subset of models to determine a combination model, and g) execute the combination model to forecast at least one future event based on the user query. The computer device uses predictive analytical results to visualize which actors, events, sentiments, and key variables across the topologies are critical to support.

19 Claims, 15 Drawing Sheets

EARLY WARNING AND EVENT PREDICTING SYSTEMS AND METHODS FOR PREDICTING FUTURE EVENTS

CROSS REFERENCE TO RELATED APPLICATIONS

This application claims priority to U.S. Provisional Application 63/009,252, filed Apr. 13, 2020, the entire contents and disclosure of which are hereby incorporated herein by reference in its entirety.

BACKGROUND

The field of the invention relates generally to predicting future events for multi-level human, social, cultural and behavioral systems and more particularly to methods and systems for determining the potential occurrence of future events during specific timelines based on current events.

The world is a complex system, and events in one location may affect or cause other events in other locations. Predicting the potential occurrence of these events may assist in preparing for, responding to, and even preventing or heading off these events. However, many existing systems are unable to contend with the massive amounts of variables that may be affecting each potential event, sources of causation and the connections between events. Furthermore, the number of sources of information is immense, as such important information, connections, and event drivers might not be coordinated or discovered until after the event has occurred and then it may be too late to have an effect on the event. Accordingly, is would be advisable to provide an early warning system on human, social, cultural, and behavioral events to be able to predict the occurrence of these events in advance with some degree of certainty.

BRIEF DESCRIPTION

In one aspect, an early warning and event monitoring computer device for predicting events is provided. The computer device includes at least one processor in communication with at least one memory device. The at least one processor is programmed to store a plurality of models associated with a plurality of future events. The at least one processor also is programmed to receive a user query. The at least one processor further is programmed to receive a plurality of data from a plurality of data sources. In addition, the at least one processor also is programmed to preprocess the plurality of data to remove noise and populate the plurality of models with the plurality of data. Moreover, the at least one processor also is programmed to determine a subset of models of the plurality of models to execute based on the user query. Furthermore, the at least one processor also is programmed to execute the subset of models to receive a plurality of results. In addition, the at least one processor also is programmed to ensemble the plurality of results from the subset of models to determine a combination model. In addition, the at least one processor is further programmed to execute the combination model to forecast at least one future event based on the user query.

In another aspect, an early warning and event monitoring system for predicting events is provided. The system includes computer device with at least one processor in communication with at least one memory device. The at least one processor is programmed to store a plurality of models for predicting a plurality of events. Each of the events is associated with one or more of the plurality of models. Each of the plurality of models includes a plurality of variables. The at least one processor is also programmed to receive a plurality of data from a plurality of sources, wherein a portion of the plurality of data is from real-time sources. The at least one processor is further programmed to update the plurality of variables for the plurality of models based on the plurality of data. In addition, the at least one processor is programmed to execute the plurality of models using the plurality of updated variables. Moreover, the at least one processor is programmed to determine a plurality of future events based on the execution of the plurality of models.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each Figure is intended to accord with a possible embodiment thereof. Further, wherever possible, the following description refers to the reference numerals include in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
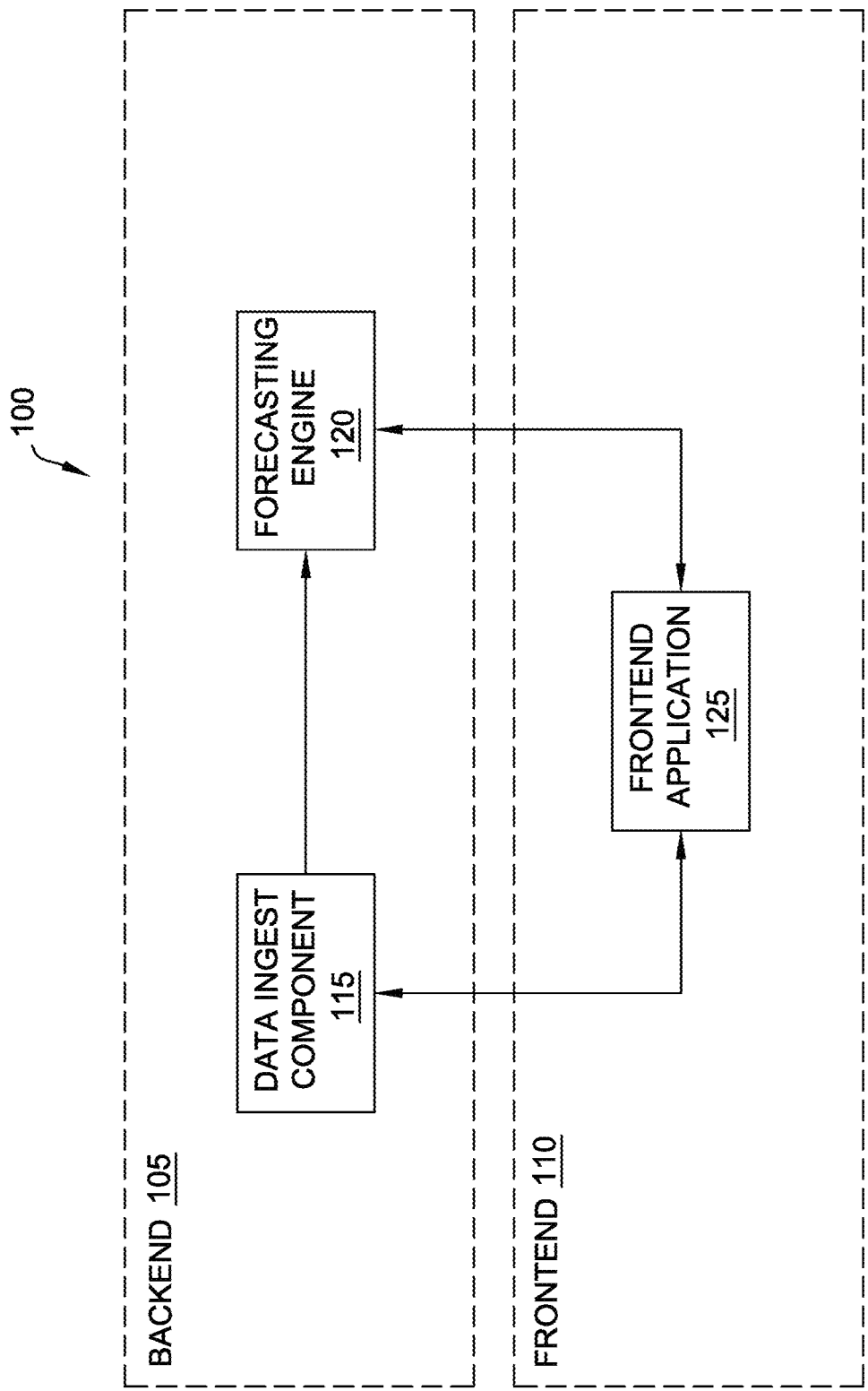
FIG. 1 illustrates a diagram of an early warning system for predicting future events for multi-party systems in accordance with one embodiment of the disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

The described embodiments enable the early warning and prediction of future events. More particularly, the present disclosure is directed an early warning and event predicting (EWEP) computer system for determining the potential occurrence of future events during specific timelines based on current events. Ones having ordinary skill in the art may determine other predictive systems where the methods and systems described herein would apply, such as, but not limited to, planning for legal action, diplomatic overtures, political events, business planning, and joint venture planning.

For the purposes of this discussion, an event is a human, social, cultural, political, or economic occurrence that occurs at a specific location and at a specific time. Events may include, but are not limited to, mergers and acquisitions, election results, civil unrest, protects, press releases, assistance, cooperation, conflict, offers of support, diplomatic accords, investigations, military action, emotional reactions, specific actor actions, prices, market indices, and public criticism and condemnation. Ones having ordinary skill in the art would understand that other events and/or types of events may be predicted as well.

The systems and methods disclosed herein describe scanning data feeds from a plurality of sources, from news feeds, to subject matter expert reports, to financial transactions, to geographic, social, cultural, political, and economic data. The data taken from these feeds are analyzed based on pre-trained models to determine locations and potential events of interest. These potential events of interest are presented to the user with the forecasted likelihood or probability of the event occurring and the confidence level in that probability. In some embodiments, potential events of interest are also presented to the user in the predicted frequency or number of times that event occurs with the forecasted confidence while in other embodiments, the potential events of interest are presented to the user as the predicted frequency and/or magnitude of the event of interest occurring with the forecasted confidence. In some embodiments, the important factors leading to that event are also presented to the user. The event is presented based on what the likely event is, when the event is likely to occur, where will it occur, and who will be involved in the event. The system shows how the forecasted likelihood of the event occurring changes in regards to time.

In the exemplary embodiment, the events are modeled based on micro, meso, and macro data to predict events in a complex adaptive systems data typology and analytical modeling framework. Micro data covers actor specific incident details, such as who, did what to whom, how, where, and when, to allow the system to understand why. Meso data covers event dynamics that interconnect individuals' micro actions, who is involved, including the networks and formation of network structures of how they are connected and interrelated, and reactions to social events, sentiment, social media, emotions, and history. Macro data covers structural political, military, economic, and social factors that describe the sum of all these events as system variables, ultimately caused by how individuals act, react, and interact across both micro and meso scales of human activity. These macro-economic, political and social structures and environments both constrain and incentivize micro human behavior. And the actor incidents and emotions create event dynamics that feedback to shape macro structures and other individual behavior over time. These interactions across micro, meso, and macro levels of human behavior sometimes create feedback loops and the coupling of micro, meso, and macro data levels to illustrate changes to human behavior and subsequent events. The macro, meso, and micro models and variables are combined to create a complex, adaptive data and forecasting system to predict events.

The system identifies the underlying structural and dynamic data associated with the events. This allows the system to identify and recognize the necessary and sufficient conditions for an event to occur across micro actor profiles, meso contexts and dynamics, and macro structural causes. This analysis includes tracking independent variables that provide the user with information on inflections, divergences, or convergences within a specific data level or across data levels. In the exemplary embodiment, the system uses automated, dynamic recursive estimation techniques to repeatedly analyze current data and to update analytic prediction models on a regular basis using the past and current data. The system also performs reinforcement learning to automatically change input variables and model forecasting architectures depending on true out of sample forecasting accuracy.

In the exemplary embodiment, the system uses both structured and unstructured data in its analysis. Structured data includes data such as country and other geo-political entity data and statistics, such as, but not limited to, traffic data, provincial data, crime, economic and market indicators, polls and surveys, mobile phone data, etc. The structured data offers a holistic view of the region, country, or province of interest, which provides the necessary conditions for the events. The unstructured data is composed of text sources, social media, web scrubbing, and video/audio broadcasting, etc. For example, analytical network metrics and models used in social media analysis may help to identify which actors have the most potential to influence. The network metrics may also be used to identify engagement, resonance, amplification, and reach for interactions that are done online or offline. Natural language processing may be used to convert text-based information into data and measures such as sentiment or trending topics, which can be used to provide insight into the behavior and inclinations of users. This data may be used to identify the main actors in social media, develop distinct profiles and personalities for each actor, and the resulting probabilities of any specific event occurring.

Once the data is organized, the system performs exploratory data analysis to validate the data and remove potential bias. The remaining variables are inputted into a dynamic correlation matrix to determine the interrelations of variables. A dynamic adjacency matrix is executed on the complete set of data to extrapolate distinct interactions and correlations between variables that may or may not change over time. The matrix recognizes unique patterns that precede events of interest to track whether these discernable patterns hold over time. The patterns are then used to develop subsequent analytical models. In some embodiments, machine learning techniques are used in the identification, stability, tipping points, and synchronization dynamics of these adjacency matrices under different variable state conditions. Methods can include cross entry and mutual information methods, convergent cross mapping (CCM), sparse identification of nonlinear dynamics, eigenvalue and spectrum decomposition, power and spectral analysis and Kuromoto oscillations. The models are then trained to recognize events using historical and current data. As the models are executed, the system determines which variables are important and which are not as vital to each model. The models are also analyzed to determine which provide the best predictions for which events and which environments.

These models and their variables are then used to make reliable short, medium, and long-term forecasts for geographical areas of interest. Then based on what occurs in reality, the forecasts are recycled through the evaluation process to be updated on a regular basis, correcting for any errors that are detected. The forecasts are provided to the user in a visualized interface to provide an intuitive manner for the user to examine the early warning results of the potential events. The events may include a likelihood of occurrence, frequency of occurrence, magnitude of occurrence, and a confidence level based on the available information for any event in a particular geographical area of interest.

For example, the forecasted likelihoods may be for a day, a week, a month, a quarter, a year, or multiple years. As the time spans change, the confidence levels associated with the events may change. Furthermore, the forecasts may be provided to the user with narrative analytics that describe who, what, where and why for the predicted events in a natural language text-based report to provide an easily understood audit path for users. In some embodiments, the forecasts may be geo-located to sub-state level and include event source attribution and media coverage associated with the predicted event. The forecasts may be configured to identify the drivers and targets of the events of interest, such as through a mapping of a network of actors, the recurrence of events, sentiment, and other key variables across micro, meso, and macro data typologies. This may include details such as interaction type and frequency with source attribution support. This allows the user to prescriptively visualize which actors, events, sentiment and other key variables across the micro, meso, and macro data typologies are critical to support, oppose, or achieve the desired outcomes.

In some embodiments, the system may receive requests from the user via natural language queries. For example, what are the emotions surrounding this merger or what will be the public reaction to this bill? The system will then generate forecasts based on that question. The system may also generate the forecasts using natural language to convey the information. In some further embodiments, the system filters the events analyzed and predicted and the data provided in the reports by user preferences. For example, a user may only wish to see events relating to a specific entity or geographic region. This allows the user to customize the searches based on specific targeted events of interest.

FIG. 1 illustrates a diagram of an early warning system 100 for predicting future events for multi-party systems in accordance with one embodiment of the disclosure. In the exemplary embodiment, the early warning system 100 includes a backend 105 and a frontend 110. The backend 105 contains the systems, databases, and processes required to predict the future events and the frontend 110 is configured to inform the users of those events and the factors behind them.

The backend section 105 includes a data ingest component 115 and a forecasting engine 120. The data ingest component 115 receives raw data from a plurality of various data sources. In some embodiments, these data sources are accessed through APIs (application programming interfaces). The data ingest component 115 integrates the data into databases associated with the system 100. In some embodiments, the databases are relational databases, which are used to store and transfer the data. In some embodiments, the data ingest component 115 cleans the data. This cleaning may include reformatting the data or removing metadata and other information that may identify the source from which the data was received. In the exemplary embodiment, some of the data is structured data, while other data is unstructured data. Unstructured data may include, but is not limited to, data from news sites, social media, blogs, and various Internet sites, where the data is collected through methods such as web scrapping APIs. Structured data may be data provided by the user, either information about themselves or information that they have direct access to. Some data may be a combination of structured and unstructured. This may include data provided by subject matter experts, as well as data about specific actors involved in one or more potential events.

After the data has been cleaned and stored, the forecasting engine 120 accesses the data. The forecasting engine 120 uses mathematical methods and processes to preprocess the data, extract features, predict the probability of an event of interest, reveal the importance of each variable used, and create prescriptive analytics to offer guidance on what key variables could be changed, via scenario analysis, to alter the forecasted event probabilities. The analytical results provided by the forecasting engine 120 are transmitted to a frontend application 125 to visualize for the user. The prescriptive analytical results may include, but are not limited to, model performance, predictions, and variable importance. In some embodiments of system 100, dynamic stochastic optimization techniques are used, such as Monte Carlo simulation methods, including sequential, Bayesian, quantum, and search tree methods.

The frontend application 125 allows the user to visualize the descriptive, predictive, and prescriptive insights provided by the system 100. The frontend application 125 may also collect analyst insights, instructions, and adjustments. These are then sent back to the forecasting engine 120 to augment the forecasting engine's 120 model behavior. Furthermore, the user may use the frontend application 125 to specify customized targets of interest and other instructions and requirements, that will then be transmitted to the data ingest component 115 to adjust the data collection process. The frontend application 125 may also request raw data from the data ingest component 115 for descriptive, predictive, and prescriptive statistics and improve visualization. In some embodiments, the frontend application 125 creates a dashboard with visualizations to intuitively display critical information to combine the data ingest component 115 and forecasting engine 120 outputs. The frontend application 125 may provide scope to allow the user to customize the analysis guidelines to ensure that pertinent and important data is tracked by the system 100. The frontend application 125 may provide natural language queries and narrative analytics that include comprehensive text and reporting explanations of the analysis results. The frontend application 125 may allow the user to dive deeper into specific events of interest to reveal probabilities, intensity measures, and duration estimates for the events.

In some embodiments, the frontend application 125 may receive requests from the user via natural language queries. For example, what are the emotions surrounding this merger or what will be the public reaction to this bill. The system 100 will then generate forecasts based on that question. The frontend application 125 may also generate the forecasts using natural language to convey the information. In some further embodiments, the system 100 filters the events analyzed, events of interest predicted, and the data provided in the reports by user preferences. For example, a user may only wish to see events relating to a specific entity, actor, or geographic region. This allows the user to customize the searches based on specific targets.

Figure 2A:
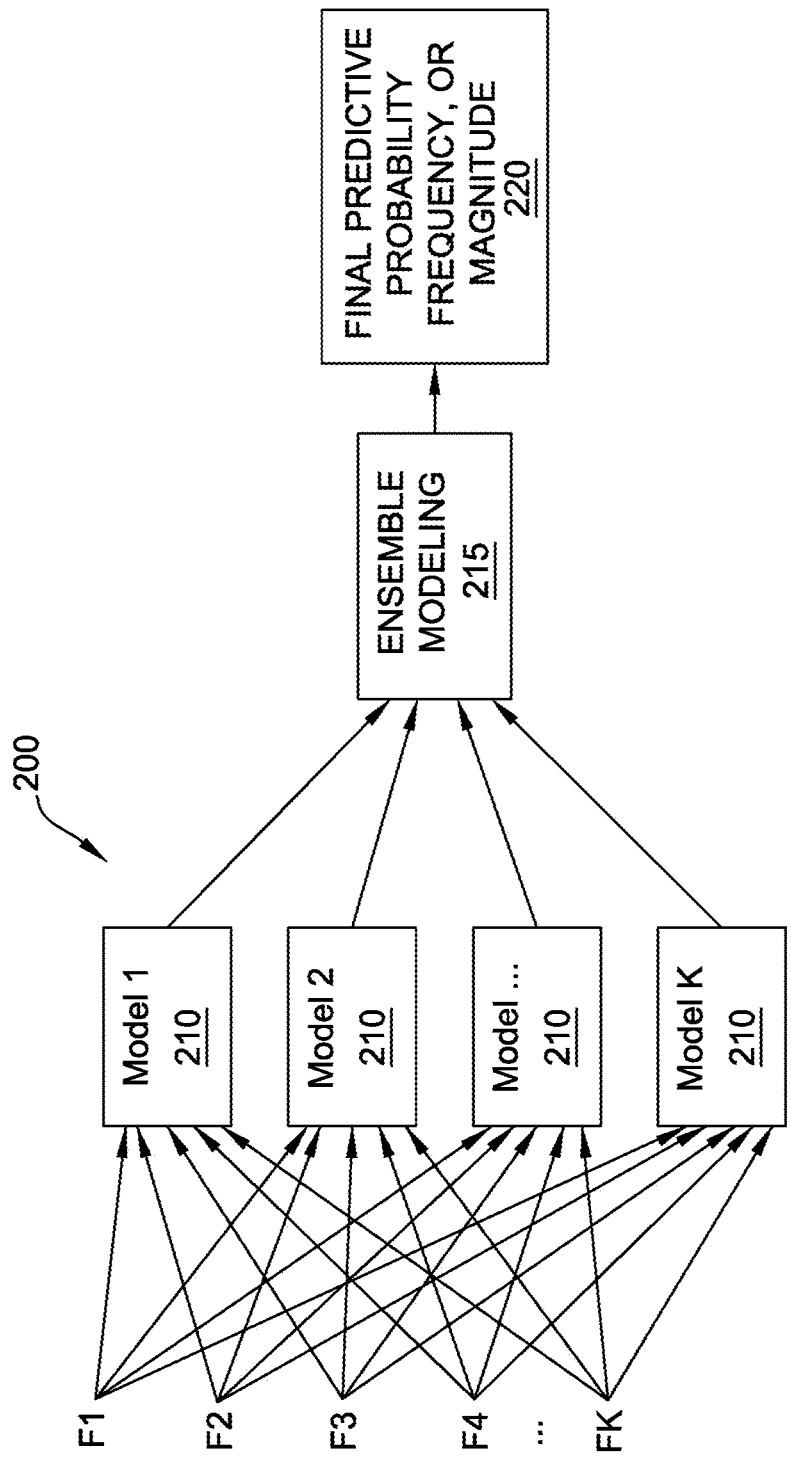
FIGS. 2A and 2B illustrate high level data flows of models in the early warning system shown in FIG. 1.

FIG. 2A illustrates a high-level data flow of the early warning system 100 shown in FIG. 1. In the exemplary embodiment, the forecasting engine 120 (shown in FIG. 1) applies a plurality of variables 205 to a plurality of models 210. In these embodiments, not all variables 205 are used in each model 210, some models 210 use the same variables 205, while other models 210 use different variables 205. And each variable 205 has a weight (i.e., (3 coefficient) associated with it in the model 210. In each model 210, the weight may be different based on the structure and type of the model 210. After each model 210 executes, the model 210 outputs a predictive probability, frequency, and/or magnitude 220 for the event being modeled. In the exemplary embodiment, different models 210 may be configured to represent different events or different methods of modeling events. The predictive probabilities for each model 210 are transmitted to multiple-stage ensemble modeling 215, which combines those predictive probabilities into a final predictive probability, frequency, or magnitude 220. In some embodiments of system 100, ensemble learning and other machine learning techniques are used.

In the exemplary embodiment, the models 210 are all executed multiple times, such as during training as well as during normal use. For each event or event type, the forecasting engine 120 determines which models 210 are the most important to the final predictive probability, frequency, or magnitude 220. The forecasting engine 120 also determines which variables 205 are the most important to the different models 210. In at least one embodiment, the forecasting engine 120 determines the importance of a variable 205 to a model 210 based on the size of the weight (β) associated with each variable 205 in the model 210. In different models 210, different variables 205 have different weights (β). Using the importance of different models 210 and the weights of the corresponding variables 205, the forecasting engine 120 is able to automatically determine which variables 205 are the most important for different events. This assists in improving the speed of the system 100, as the forecasting engine 120 is able to determine which variables 205 and/or models 210 are important to which situations/events and only access and use those variables 205 and/or models 210 in its calculations, thereby reducing the computational resources and time required to perform the calculations and modeling. Furthermore, the system 100 may keep a track record of the important variables in different conditions to assisting in preprocessing, inputs into the dynamic adjacency matrix calculations, and future variable and model selection. For example, in a system 100 with thousands or millions of variables 205 and hundreds or thousands of models 210 the forecasting engine 120 may be able to reduce the number of important variables by several orders of magnitude. This reduction of variables may be for specific events. The reduction of variables may also be used all throughout the whole system 100.

While only two layers of models 210 are shown in this figure, the system 100 may include multiple layers of models 210, where the predictive probabilities of one layer are fed into the next layer and then the predictive probabilities of that layer are fed into the next. The number of layers and the models 210 in those layers may change based on the number of input variables, events being modeled and the training of the system 100. In some embodiments, the importance of the different modeling architectures is found through analysis, such as, but not limited to supervised and unsupervised machine learning methods. As such the performance of the different variables 205 in different models 210 may adjust over time.

Figure 2B:
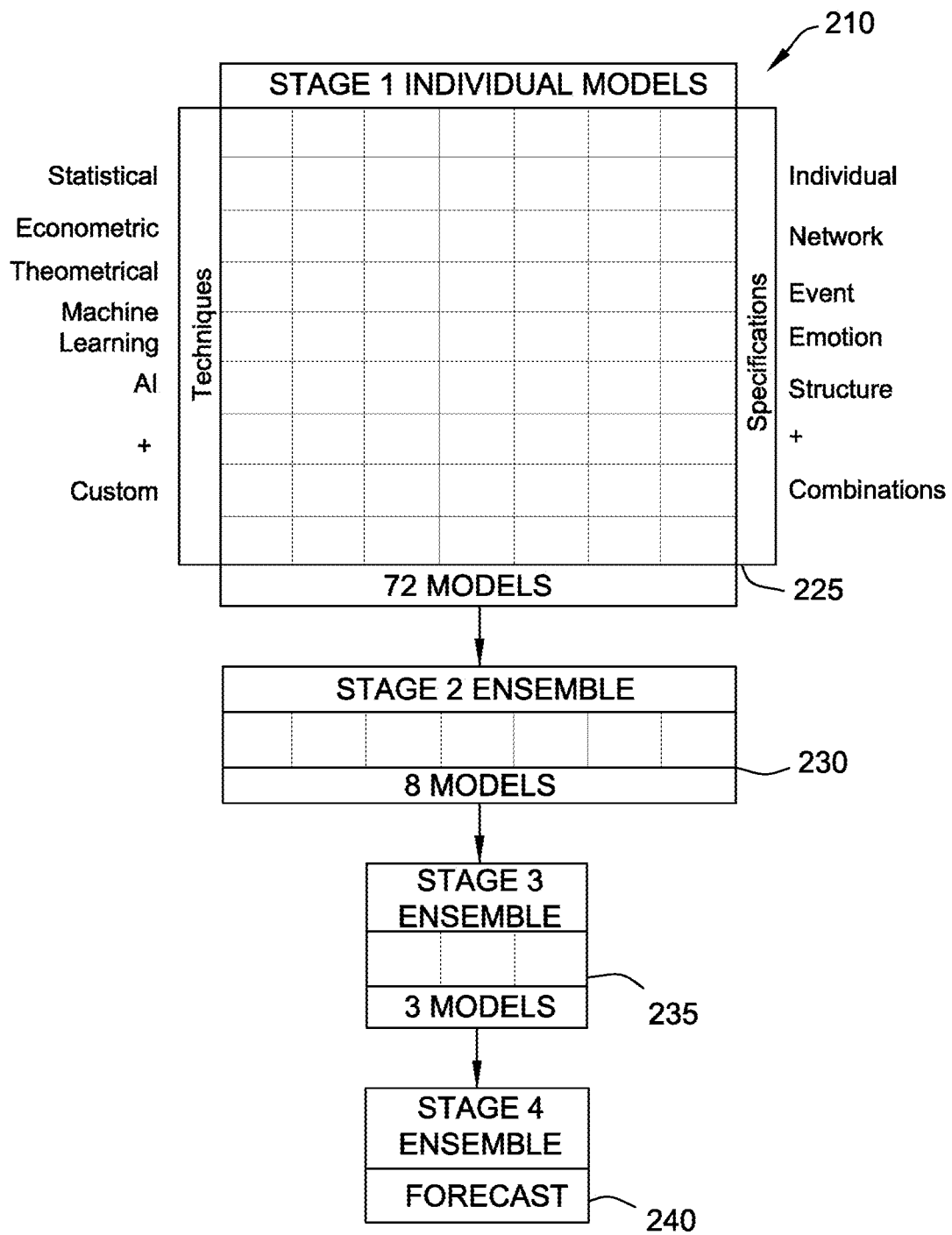

FIG. 2B illustrates another high-level overview of the data flows. This figure illustrates the reduction in models 210 that takes place during the ensembling process. In Stage 1 225, all of the models 210 are considered, each block represents a different model. The system 100 reduces the number of models based on the weights of each model 210 for the event being analyzed. This reduces to a second number of models 210 in Stage 2 230. For example, as show in FIG. 2B, the number of models reduces from over 72 in Stage 1 225 to 8 models in Stage 2 230. In the example shown in FIG. 2B, the number of models reduces again, to three, in Stage 3 235. From the three models 210 in Stage 3 235, the system 100 is able to determine the forecast 240. While three reductions are shown here in FIG. 2B, the number of reductions may change based on the event and the corresponding weights. For example, there may be 5 stages to reduce the number of models 210 to a point where the forecast 240 may be determined. The number of models, the specific type of models and the number of stages is also dynamically and automatically determined given true out of sample model performance for each event of interest and other signal boosting techniques 815 (shown in FIG. 8). As shown in FIG. 2A the number of stages and the number of models for each stage are variable and may be based on the corresponding event of interest.

As used herein, automated ensemble forecasting fuses the best or most relevant models together to increase predictive power, while minimizing false alarms. The models 210 effectively 'compete' against each other to achieve the best, most accurate forecast possible. As described herein, the system 100 uses multiple techniques, such as, but not limited to, boosting 650, bagging 655, and multi-stage stacking 660 (all shown in FIG. 6) to minimize forecast bias and variance. Cross-validation and regularization techniques may also be used to enhance performance. The system 100 uses continuous dynamic ensemble estimation and AI optimization techniques to learn from the various model's track records or past behavior to identify new signals, patterns, and drivers of event behavior to increase forecast accuracy.

Figure 3:
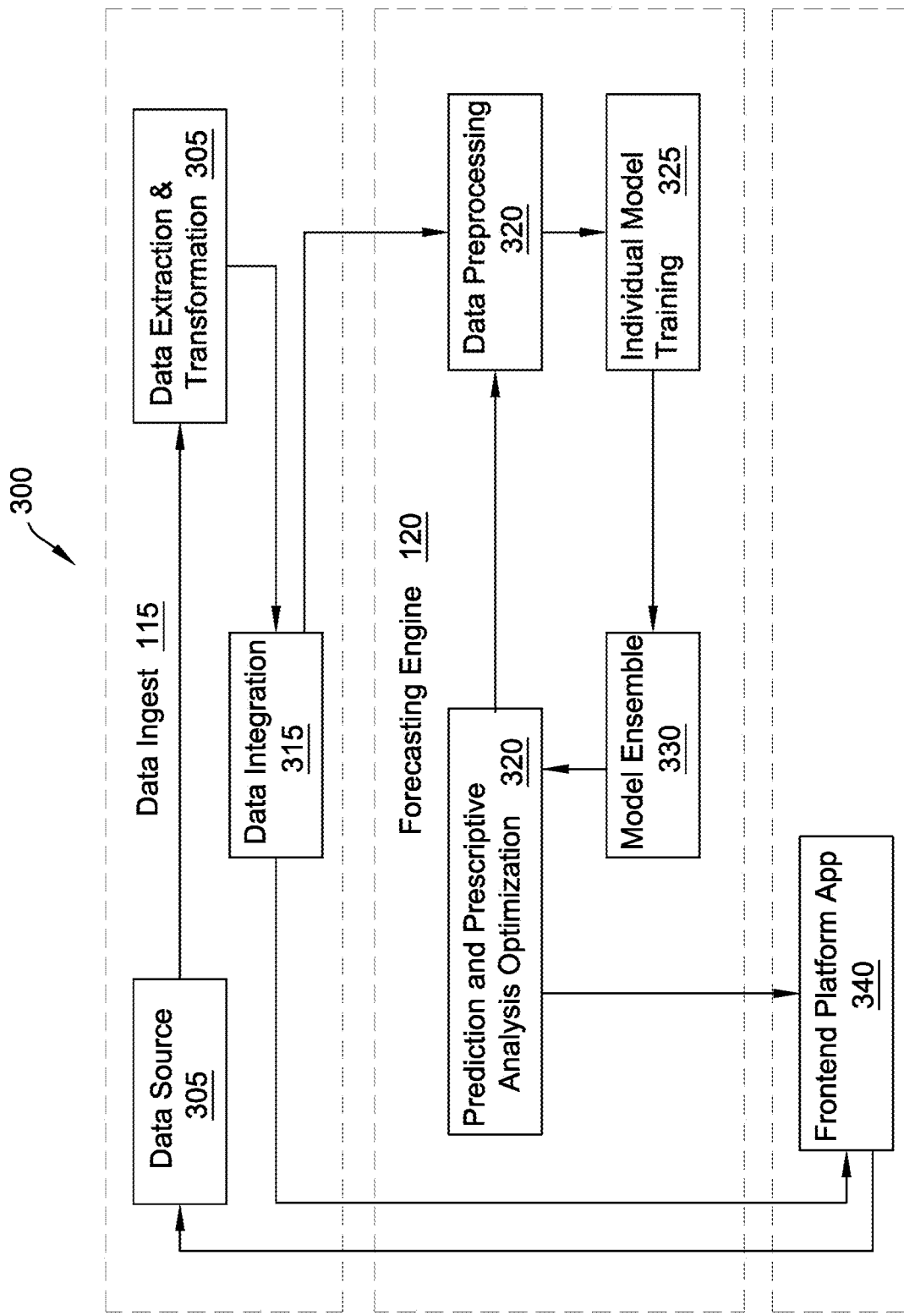
FIG. 3 illustrates a schematic diagram of an early warning system for predicting future events for multi-party systems in accordance with one embodiment of the disclosure.

FIG. 3 illustrates a schematic diagram of an early warning system 300 for predicting future events for multi-party systems in accordance with one embodiment of the disclosure. In the exemplary embodiment, the data ingest component 115 may be divided into three portions: data source 305, a data extraction and transformation component 310, and data integration component 315. The data source 305 refers to where the raw data comes from. This may include, but is not limited to news archive databases, websites, financial information, and economic databases. The raw data is collected using various APIs, including web scrapers. In the exemplary embodiment, the raw data is stored in one or more databases until accessed by the data extraction and transformation component 310. The data extraction and transformation component 310 filters the raw data to remove irrelevant data. Then the remaining data is parsed into useful variables and information. The data extraction and transformation component 310 transforms and reformats the data into a more organized structure across micro, meso and macro levels of human activities.

The data integration component 315 integrates the data from all of the different data sources 305 into the Macro 405, Meso 410, and Micro 415 levels of human, economic, political, social, cultural and behavioral data and of the complex adaptive modeling system 400 as shown in FIG. 4. In the exemplary embodiment, the data may be stored in one or more databases.

The forecasting engine 120 is divided into four components: a data preprocessing component 320, individual model training 325, a model ensemble component 330, and a prediction and prescriptive analysis optimization (PPAO) component 335.

In the exemplary embodiment, the data preprocessing component 320 cleans the data and generates/derives additional variables. For example, one of the data sources 305 may provide stock market data on a daily or hourly basis. This data is noisy with many quick ups and downs, therefore, the data preprocessing component 320 may derive period moving averages to provide smoother data to the models. The data preprocessing component 320 also performs a selection process on the variables to be used in the various models. In some embodiments, the selection process includes selecting the variables based on their weights and past history in the various models, their forecasting performance or other complex adaptive system diagnostics from the dynamic adjacency matrices.

Many models use different combinations of micro, meso and macro variable types. These models are trained by the individual model training component 325, such that each model uses different information.

The model ensemble component 330 performs machine learning, such as intelligence crowd sourcing across variables and models. In the exemplary embodiment, different models may make different predictions. The model ensemble component 330 blends the individual model results together in multiple stages, to make a final prediction, such as via adaptive boosting or other ensemble and machine learning techniques. In some embodiments, true out of sample model performance is evaluated, in addition to other data indicators and performance metrics, and reinforcement learning techniques are employed so that models and forecasting architectures 210 and 225-240 (shown in FIG. 2B) are automatically and dynamically changed to achieve better forecasting accuracy.

After the models are blended, the PPAO component 335 choses the final combination model to use for the prediction. The PPAO component 335 identifies the important variables. In some embodiments, the PPAO component 335 uses the important variables via dynamic stochastic optimization and Monte Carlo methods described herein, to run one or more what-if scenarios. In some embodiments, the PPAO component 335 notifies the data preprocessing component 320 of the important variables to ensure that the important variables are taken into account when the models are retrained in the future. In some embodiments of system 100, the PPAO component 335 performs prescriptive analysis to show what user actions affect which key variables across micro, meso, and macro data typologies with dynamic stochastic optimization techniques to change forecasted event probabilities, frequencies, and magnitudes.

In the exemplary embodiment, the steps of the forecasting engine 120 form a loop, which is continually executed as data changes over time. Furthermore, the loop in the forecasting engine 120 is repeated based on the comparison of the actual events that occurred and the predictions of those events to modify the weights, variables, and models that comprise the system 300.

A frontend platform app 340, which may be similar to the frontend application 125 (shown in FIG. 1) outputs the data from the PPAO component 335 to the user. In some embodiments, the frontend platform app 340 combines the output from the PPAO component 335 with raw data from one of more of the data sources 305. In the exemplary embodiment, the output includes predictions for one or more future events. In some embodiments, the frontend platform app 340 provides the user with a descriptive analysis of the data to provide improved situational awareness. For example, events may be highlighted on a map or displayed in a list. In some examples, the frontend platform app 340 may generate and display a network of the interactions between various actors involved in or influencing one or more of the events. Furthermore, the frontend platform app 340 may receive input from the user to update or delete existing events of interest and/or add new events of interest. This will instruct the backend 105 (shown in FIG. 1) to process these requests during the next update period. In the exemplary embodiment, the system 100 is configured to update every predetermined period of time, i.e., every 5 minutes, 15 minutes, hour, day, or week or in real-time. The system 100 collects new data during that predetermined period of time and the models 210 will be re-executed. In some embodiments, the models 210 are retrained every day or every longer period to ensure they are up to date.

In the exemplary embodiment, the frontend platform app 340 generates displays for summarizing one or more events based on the issues analyzed. The events may be displayed based on other associated events, a timeline, likelihood of occurrence, frequency of occurrence, and/or magnitude of occurrence. The frontend platform app 340 utilizes narrative analytics with machine learning and other techniques to automatically create natural language text interpretations, alerts and on demand reports for human consumption. The frontend platform app 340 may write meta-level summary reports for human consumption given all detailed results and reports.

In the exemplary embodiment, the frontend platform app 340 generates a text narrative report of the results of the analysis. In some embodiments, the report includes narrative analytics and an expert system to automatically generate summary text that interprets the results of each event in natural language. In some embodiments, the frontend platform app 340 uses the key performance indicators and criteria that measure each event with likelihoods, such as via Monte Carlo simulation methods, and confidence, such as through law of large number simulation techniques. Given the various key performance metrics, the system automatically generates a text report for human consumption.

In the exemplary embodiment, the frontend platform app 340 utilizes key performance metrics, and then takes each event result, and categorizes the event, actors, network of relations, etc. into a narrative text. The frontend platform app 340 may also create scores for each event that allow users to quickly compare events across multiple event simulations. Individual event simulations are compared and contrasted to write meta-level reports that summarize all analyses.

In some embodiments, the event output may be used to influence actions to affect the potential future events. The actors and network of relations may be used in simulations to determine actions that may be taken to change the probability of specific future events from happening. The system 300 may generate further simulations to list causes that may be influencing a future event. The user may then suggest one or more actions to take and the system 300 determine how much those one or more actions may affect the outcome of the future event. For example, a future event may be a protest that has a high likelihood of occurring in a period of time. The user may execute simulations via the system 300 to see if holding a press conference and/or announcing a community outreach program would reduce the probability of the protest event from occurring.

Figure 4A:
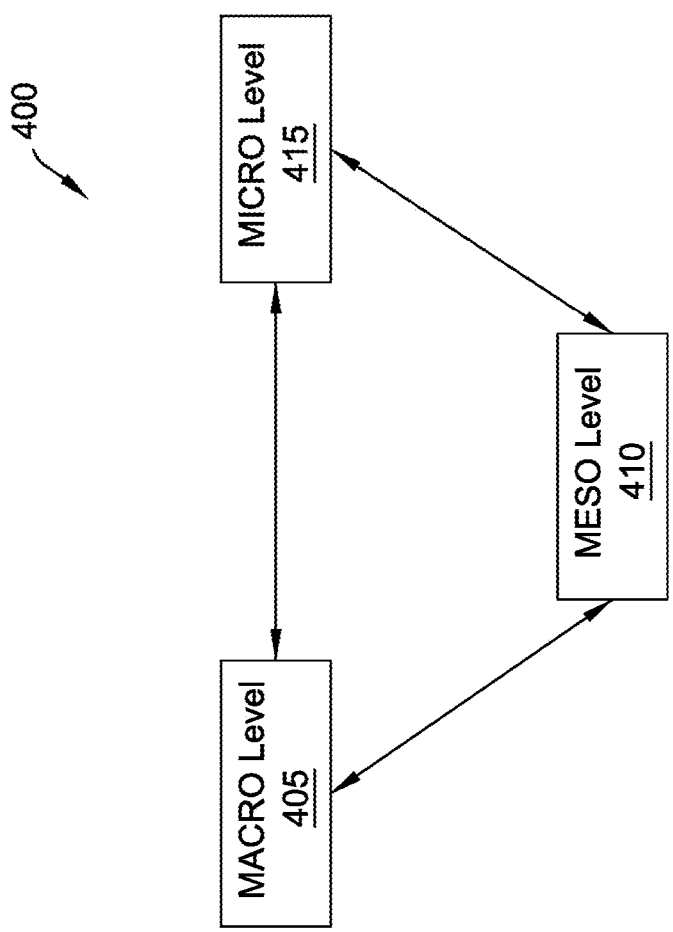
FIGS. 4A and 4B illustrate a data flow diagrams of example interactions between macro, micro, and meso levels of the system shown in FIGS. 1 and 3.

FIG. 4A illustrates a data flow diagram of example interactions between macro 405, micro 415, and meso 410 levels of the systems 100 and 300 shown in FIGS. 1 and 3. In the exemplary embodiment, the system 100 uses a complex adaptive modeling system 400, which models the interactions between data and models on the macro 405, meso 410, and micro 415 levels.

The macro level 405 represents the macro structural environment. This may include, but is not limited to, economic indicators, financial market trends, social indicators, and political power structures. The models on this level may include, but are not limited to, theoretical economic, political, social, business, psychological models, statistical and econometric models, and unsupervised machine learning models.

The micro level 415 represents the behavior of individual actors, including their decision-making processes and event occurrence probabilities. The models on this level may include, but are not limited to, theoretical economic, political, social, business, psychological, statistical models, and machine learning models.

The meso level 410 represents the interactive dynamics between individual actors, institutional actors, and national actors. The models on this level are primarily network and directed acyclic graph models that map out the relationships and interactions between these actors.

In the exemplary embodiment, these three levels of models interact with each other by being independent variables in each other's models. This allows the system 100 to build cross-correlation matrices of outputs from the different levels of models. Furthermore, these interactions allow the models to determine which types of variables, macro, meso, and/or micro, have the most effect on the occurrence of different events. In some embodiments, system 100 estimates the coupling and interactive effects of the different levels of data typologies and model frameworks using complex adaptive systems methodologies with various threshold indicators.

Figure 4B:
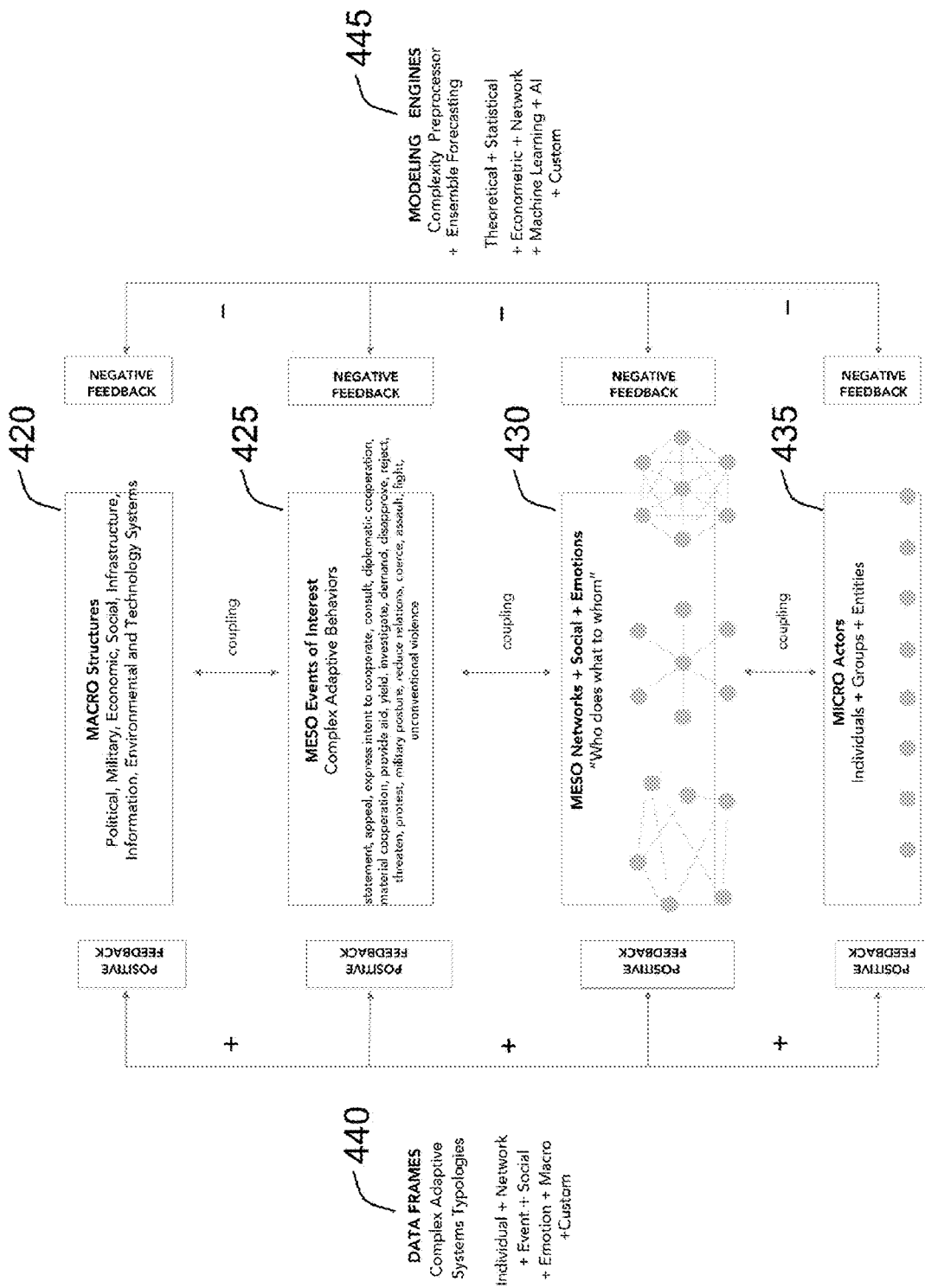

FIG. 4B illustrates another data flow diagram of example interactions between macro 405, micro 415, and meso 410 levels of the systems 100 and 300 shown in FIGS. 1 and 3. FIG. 4B highlights how the data and modeling systems are unified by a complexity framework. The synergy between the data system and the modeling system is critical to providing accurate and actionable early warnings based on the increased connectivity, complexity, and uncertainty surrounding human, social, cultural, and behavioral events.

As shown in FIG. 4B, Macro Structures 420 are coupled to Meso Events of Interest 425, which are then coupled to Meso Networks 430, which are in turn coupled to Micro Actors 435. The Macro Structures 420 include political, military, economic, social, infrastructure, information, environmental, and technology systems. The Meso Events of Interest 425 describe and analyze complex adaptive behaviors. Examples of these behaviors may include human, social, cultural, economic, business, finance, political and military events, but are not limited to, statement, appeal, express intent to cooperate, consult, diplomatic cooperation, material cooperation, provide aid, yield, investigate, demand, disapprove, reject, threaten, protest, military posture, reduce relations, coerce, assault, fight, and unconventional violence among many others. The Meso Networks 430 include social networks and emotions, including 'who does what to whom.' The Micro Actors 435 are activities of individuals, groups, and entities.

Feedback from these are fed into data frames 440 and modeling engines 445 to generate and improve forecasts. The data frames 440 include complex adaptive systems typologies, which combine individuals, networks, events, social data, emotion data, and macro data. The modeling engines 445 include complexity preprocessing to identify and diagnose feedback and coupling across micro, meso and macro data scales and ensemble forecasting as described herein. The feedback loops illustrate how the models and variables are coupled, such as by analyzing dynamic adjacency matrices and complexity indicators. The feedback loops can provide positive, negative, and no feedback. The modeling engines 445 combine theoretical, statistical, econometric, network, machine learning, and AI.

As described herein, data and models that do not take into account both within and cross scale effects might perform poorly and miss warnings on important events. The system 100 described herein employs multiple generated intermediate variables and forecasting models. These may include, but are not limited to, lags, moving averages, differences, as well as other composite variables and models. For example, researchers cannot focus at predicting protest events alone without taking into account other antecedent events of interest that might lead up to a protest event, such as demands from specific groups to a government, increasingly negative narratives, and the subsequent rejection of those demands. Whether explained via contagions, second order domino effects, or through necessary sufficient conditions, events of interest to not occur in a siloed vacuum.

The system 100 described herein, tests interactive events to capture the unique conditional data and cross-scale variable effects. For example, increasing trade openness may benefit democratic regime stability, but may also increase corruption in other regime types. Without analyzing the interactive effects between key drivers, not only within but across behavior scales, in some circumstances a variable can have a positive effect, but in others it can no effect or a negative effect on the event of interest.

One other methodology is to check the correlations between variables at different points in time to see how the correlations and other measures of covariate mutual information change. The system 100 analyzes these different changes to look for trends, such as, cycles and critical points. The variance of the change of the correlation may increase before a related event occurs. Therefore, the system 100 analyzes historical events and the correlations leading up to those events, such as changes in variance, to be able to determine which triggers indicate that the event may be about to occur.

Figure 5:
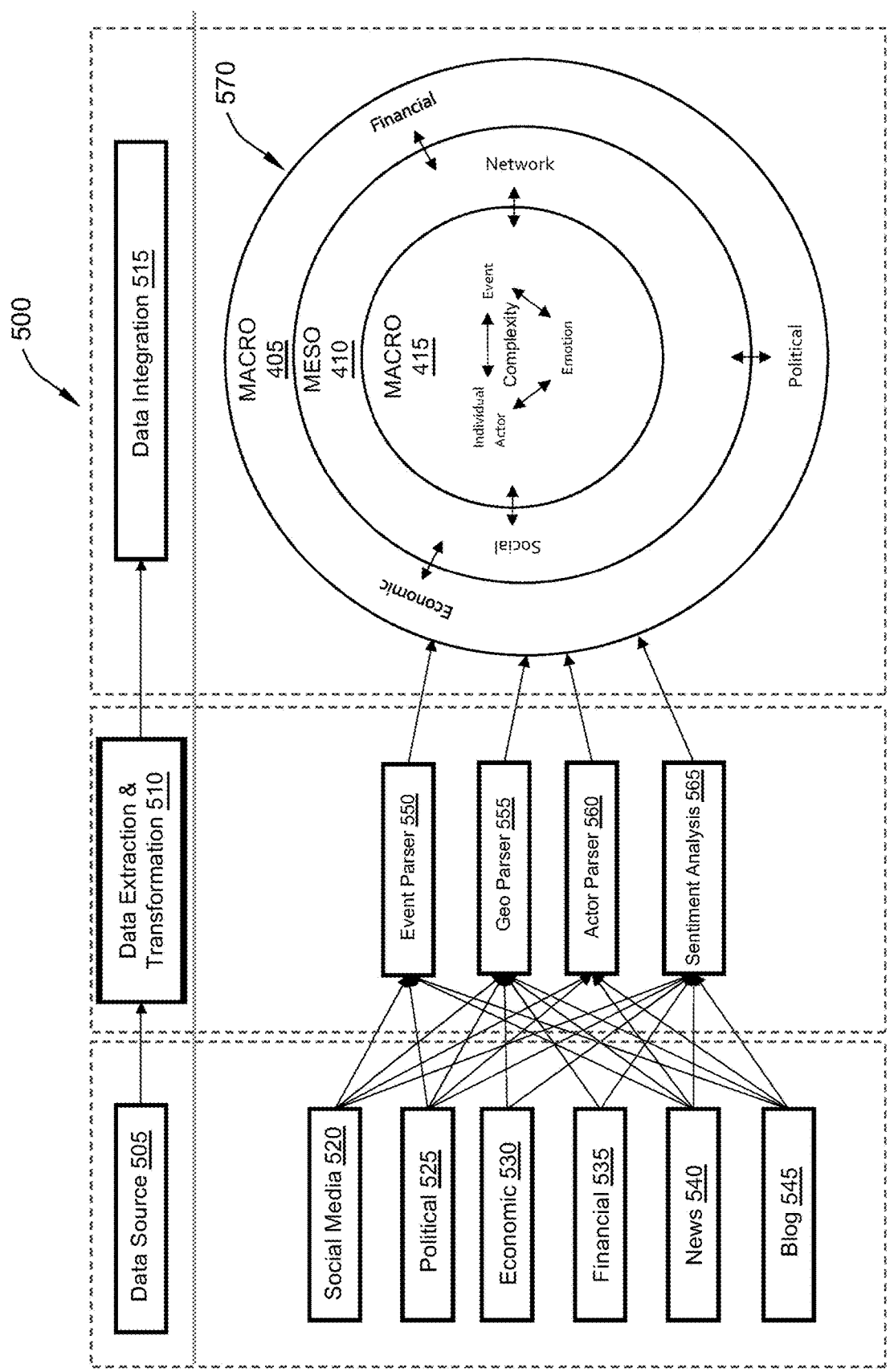
FIG. 5 illustrates a data flow diagram of an exemplary data extraction process using the system shown in FIGS. 1 and 3.

FIG. 5 illustrates a data flow diagram of an exemplary data extraction process 500 using the systems 100 and 300 shown in FIGS. 1 and 3. In the exemplary embodiment, process 500 is performed by the backend 105 as a part of the data ingest 115 (both shown in FIG. 1).

In the exemplary embodiment, the system 100 receives a plurality of data from a plurality of data sources 505, which may be similar to data source 305 (shown in FIG. 3). The data source 505 may be associated with different categories including, but are not limited to social media 520, political 525, economic 530, financial 535, news 540, and blogs 545. Each one of these categories may include multiple data sources 505 that may include open sources and data APIs. Ones having skill in the art would understand that other data sources 505 may be used based on the events being predicted. The raw data from these data sources 505 may come in various formats. The raw data is stored in one or more databases associated with the backend 105.

A data extraction and transformation component 510, which may be similar to data extraction and transformation component 310 (shown in FIG. 3), applies several parsers to extract useful information from the raw data. For example, who did what to whom? In the exemplary embodiment, these parsers include an event parser 550, which detects events that have occurred, a geo parser 555, which detects a location associated with different events or where data is coming from, an actor parser 560, determines the different actors that are involved, and a sentiment analyzer 565, which detects emotions associated with or based on the data.

At the end of process 500, the extracted information is organized and stored in a complex adaptive system framework 570, which may be similar to complex adaptive modeling system 400 (shown in FIG. 4), by a data integration component 515, which may be similar to the data integration component 315 (shown in FIG. 3). In the exemplary embodiment, the data is divided into the three levels/categories of macro 405, meso 410, and micro 415. The macro level 405 contains structural variables about the general market and political environment. The meso level 410 contains the networked interaction dynamics and interactions between individual actors. The micro level 415 contains variables that reflect individual actor's or entity's information and actions. These also include how emotions factor into the individual's actions. The complex adaptive system framework 570 also measures complexity, which may include, but is not limited to, coupling feedback, autocorrelation, and flickering.

Figure 6:
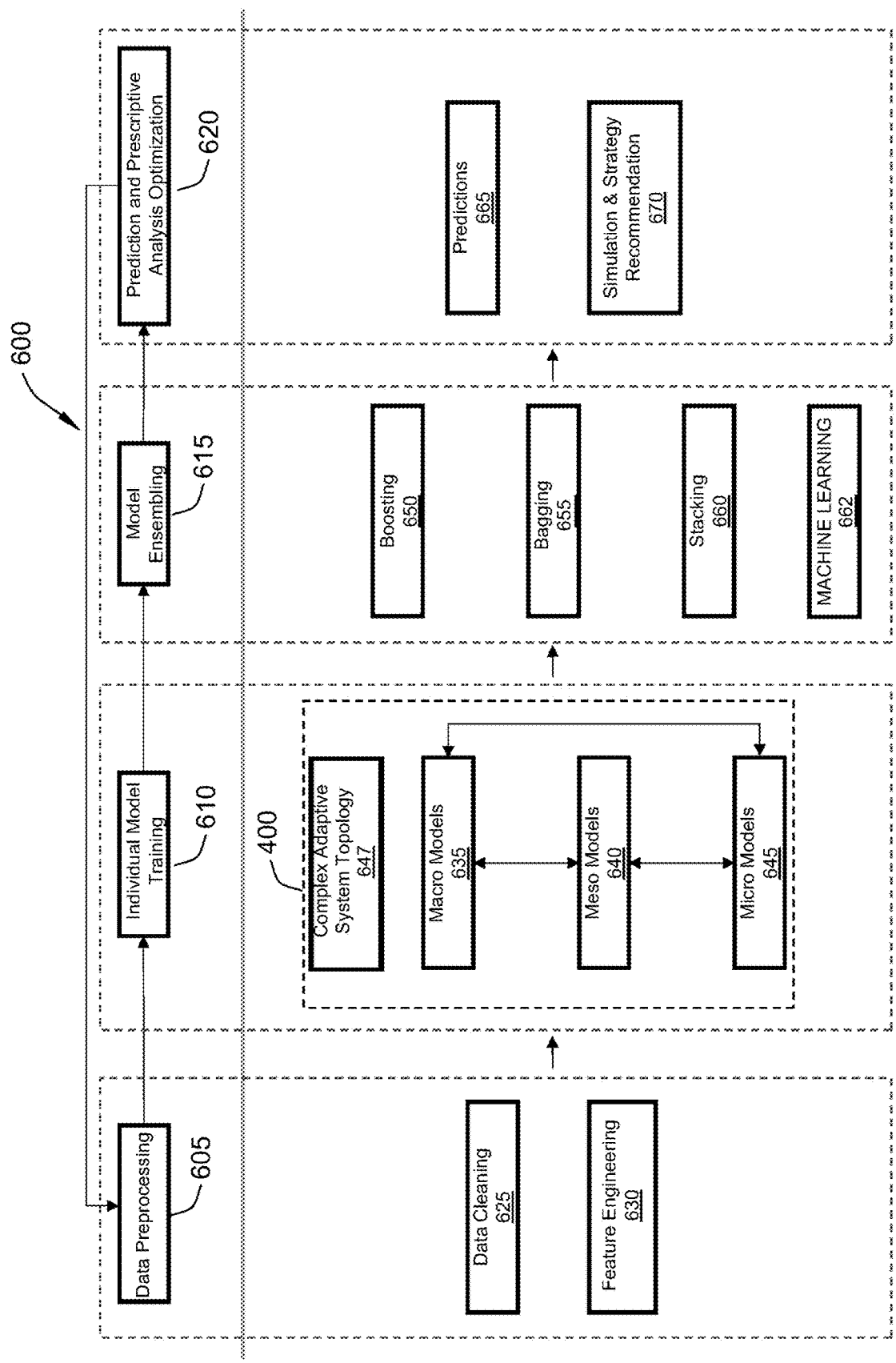
FIG. 6 illustrates a data and analytical model flow diagram of an exemplary data and analysis process using the system shown in FIGS. 1 and 3.

FIG. 6 illustrates a data and analytical model flow diagram of an exemplary data and analysis process 600 using the systems 100 and 300 shown in FIGS. 1 and 3. In the exemplary embodiment, process 600 is performed by the backend 105 as a part of the forecasting engine 120 (both shown in FIG. 1).

In the exemplary embodiment, a data preprocessing step 605 is performed by the data preprocessing component 320 shown in FIG. 3. The data preprocessing steps 605 includes data cleaning 625 and feature engineering 630, which are described in more detail in FIGS. 7 and 8 respectively.

The individual model training step 610 is performed by the individual model training component 325, shown in FIG. 3. The individual model training step 610 uses the complex adaptive modeling system 400 shown in FIG. 4. As described previously, the complex adaptive modeling system 400 includes dynamic adjacency matrices, models, and variables. The models include macro models 635, meso models 640, micro models 645, and complex adaptive system typology 647, which include mixes of the macro, meso, and micro models and variables. In the individual model training step 610, the complex adaptive modeling system 400 is used to model the structural trends, individual actors' behavior, and the dynamics among individual actors and their networked interactions across the three levels. The complex adaptive modeling system 400 models that society is composed of social groups (nations, organizations, etc.) where structural environment change will affect individual actor's decision making process, and individual actors' behavior/action will conversely affect how social, political, and economic environments dynamically change. The different individual models are built and organized to capture these unique, event specific dynamics. In the exemplary embodiment, this overcomes traditional models' limitations, which assumes the same pattern/behavior will happen overtime based on fixed relationships across micro, meso, and macro levels of human behavior.

Different models use different information, which might be biased by itself. Accordingly, process 600 includes the model ensembling step 615, which is performed by the model ensemble component 330, shown in FIG. 3. The model ensembling step 615 crowdsources the insights from individual models and combines their predictions to generate final predictions. The multi-stage model ensembling step 615 uses various different blending methods to account for the statistical properties of the models, the types of models, and model forecasting past performance. In some embodiments of system 100, these three methods include: boosting 650, bagging 655, and stacking 660. The boosting 650, bagging 655, and stacking 660 procedures use machine learning 662, such as, but not limited to, Bayesian, Neural Networks, Deep Learning, Recurrent Neural Networks, Generative Adversarial Networks and other Machine Learning algorithms or other methods for dynamic, adaptive model ensembling.

The best blended model is selected based on a plurality of performance metrics (accuracy, AUC, RMSE, etc.) and deployed in the prediction and predictive analysis optimization step 620 to generate predictions 665 of event occurrence probabilities up to three months in the future. The prediction and prescriptive analysis optimization step 620 may be executed by the PPAO component 335 (shown in FIG. 3), using Monte Carlo and other simulation techniques discussed herein. In addition, based on the feature/attribute coefficients and model weights in the blended model, each feature's importance scores are calculated. The importance scores reflect how sensitive the probability of event occurrence to corresponding independent variable changes.

Based on the importance scores of features, simulation and strategy recommendations 670 are performed to automatically generate recommendations to be provided to the end user about which variable is the most important to lead an event to happen. The user can experiment and simulate possible outcomes by changing the values of independent variables to see if/how they can change the probability of an event of interest occurring.

In some embodiments, the PPAO step 620 determines which variables that the user can personally affect and then make changes to those models to determine how the predictions 665 of the events change based on the changes in the user's variables. This may be used to reduce or increase the likelihood, frequency, and/or magnitude of an event.

Figure 7:
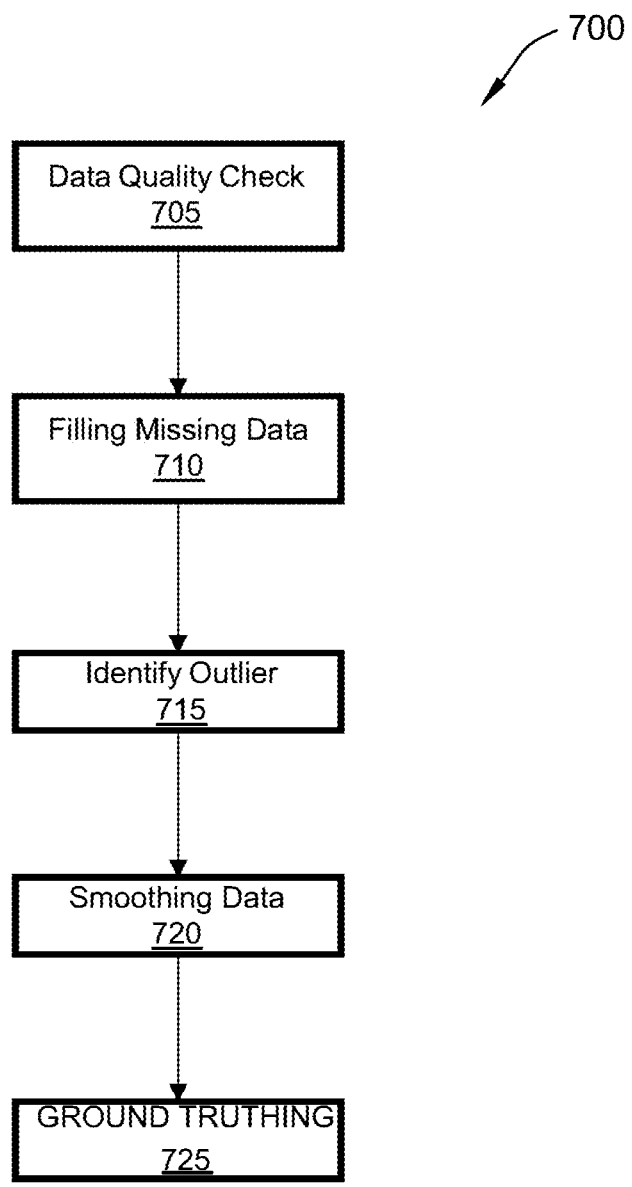
FIG. 7 illustrates a graphical flow chart of a process for cleaning data in accordance with the process shown in FIG. 5.

FIG. 7 illustrates a graphical flow chart of a process 700 for cleaning data in accordance with the process 600 shown in FIG. 6. In the exemplary embodiment, process 700 is similar to data cleaning 625 shown in FIG. 6. In some embodiments, process 700 is performed by the data preprocessing component 320, shown in FIG. 3, and/or the EWEP computer device 910 (shown in FIG. 9).

In the exemplary embodiment, the data preprocessing component 320 performs a data quality check 705, which checks the completeness of the data to see if it contains any missing data and if the frequency of data received is consistent across different sources. To fill the missing data 710, the data preprocessing component 320 may use methods such as, but not limited to, mean, median, interpolation, extrapolation, Brownian bridge, and/or Bayesian based methods.

The data preprocessing component 320 identifies outliers 715 and performs data smoothing 720. The data smoothing 720 may be performed by binning, clustering mean, regression, and/or moving average or other transformation methods. Finally, the data preprocessing component 320 performs a ground truthing 725 to check the quality of the resulting data from previous process based on domain knowledge and automatic event of interest creator recommender system 1200 (shown in FIG. 12).

Figure 8:
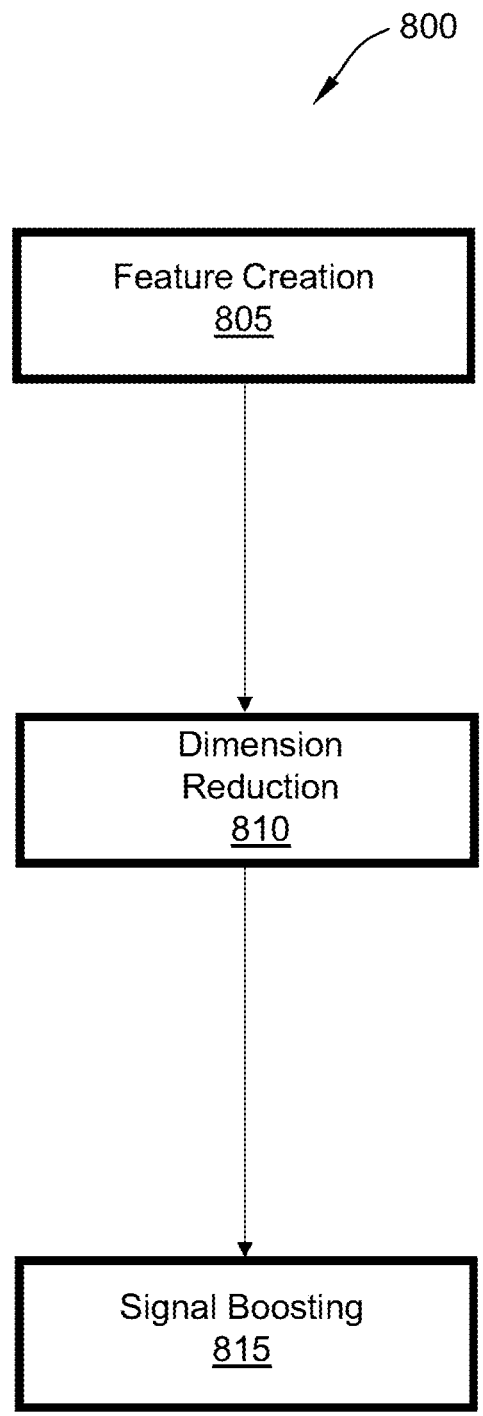
FIG. 8 illustrates a graphical flow chart of a process for identifying important variables using the system shown in FIGS. 1 and 3.

FIG. 8 illustrates a graphical flow chart of a process 800 for identifying important variables in accordance with the process 600 shown in FIG. 6. In the exemplary embodiment, process 800 is similar to feature engineering 630 shown in FIG. 6. In some embodiments, process 700 is performed by the data preprocessing component 320, shown in FIG. 3, and/or the EWEP computer device 910 (shown in FIG. 9).

First, the data preprocessing component 320 performs feature creation 805. This includes methods, such as, but not limited to: quantization, normalization, scaling, aggregation, interaction variables (+ − * / |), lagging, moving average, convergent cross mapping (CCM), sparse identification of nonlinear dynamic systems (SINDY), Kuromoto oscillations, eigenvalue and spectrum distributions, power and spectral analysis and synchronizations which are based on the correlations of the dynamic adjacency matrix results described earlier on the coupling signals of macro, meso, and micro variables.

Next, the data preprocessing component 320 performs dimension reduction 810 to limit the number of new features/variables and remove redundant or unnecessary variables. One method of dimension reduction 810 is to aggregate multiple variables together into a single variable or principal component. The system is then able to perform analysis on the principal components, rather than dealing with a significantly larger number of variables. The data preprocessing component 320 may perform techniques such as, but not limited to clustering analysis, correlation analysis, mutual information, binning, vector quantization & mixture models, principle component analysis, principle curves, surfaces, and manifold, generative topographic mapping, self-organizing maps, elastic maps, nets, principle graphs and principle trees, kernel entropy component analysis, factor analysis, independent component analysis, non-negative matrix factorization, principal tensor analysis & non-negative tensor factorization, generalized singular value decomposition (SVD), sparse representation & overcomplete dictionaries, projection onto interesting direction, projection onto manifolds, low variance filter, and stepwise feature reduction. These techniques may be selected based on the properties of the variables.

Finally, the data preprocessing component 320 performs signal boosting 815 to check if the most important variables identified from previous models are included in the selected feature sets. If not, then the data preprocessing component 320 ensures that they are included. The data preprocessing component 320 includes or creates additional interaction variables/features that demonstrate increasing coupling strength that have been modeled and predicted by CCM, SINDY, eigenspectral and other dynamic adjacency matrix synchronization models discussed earlier. In some embodiments, machine learning techniques are used in the identification, stability, tipping points and synchronization dynamics of these adjacency matrices under different variable state conditions. Methods can include convergent cross mapping (CCM), sparse identification of nonlinear dynamics, eigenvalue and spectrum decomposition, power and spectral analysis, recurrence analysis and Kuromoto oscillations among others.

Figure 9:
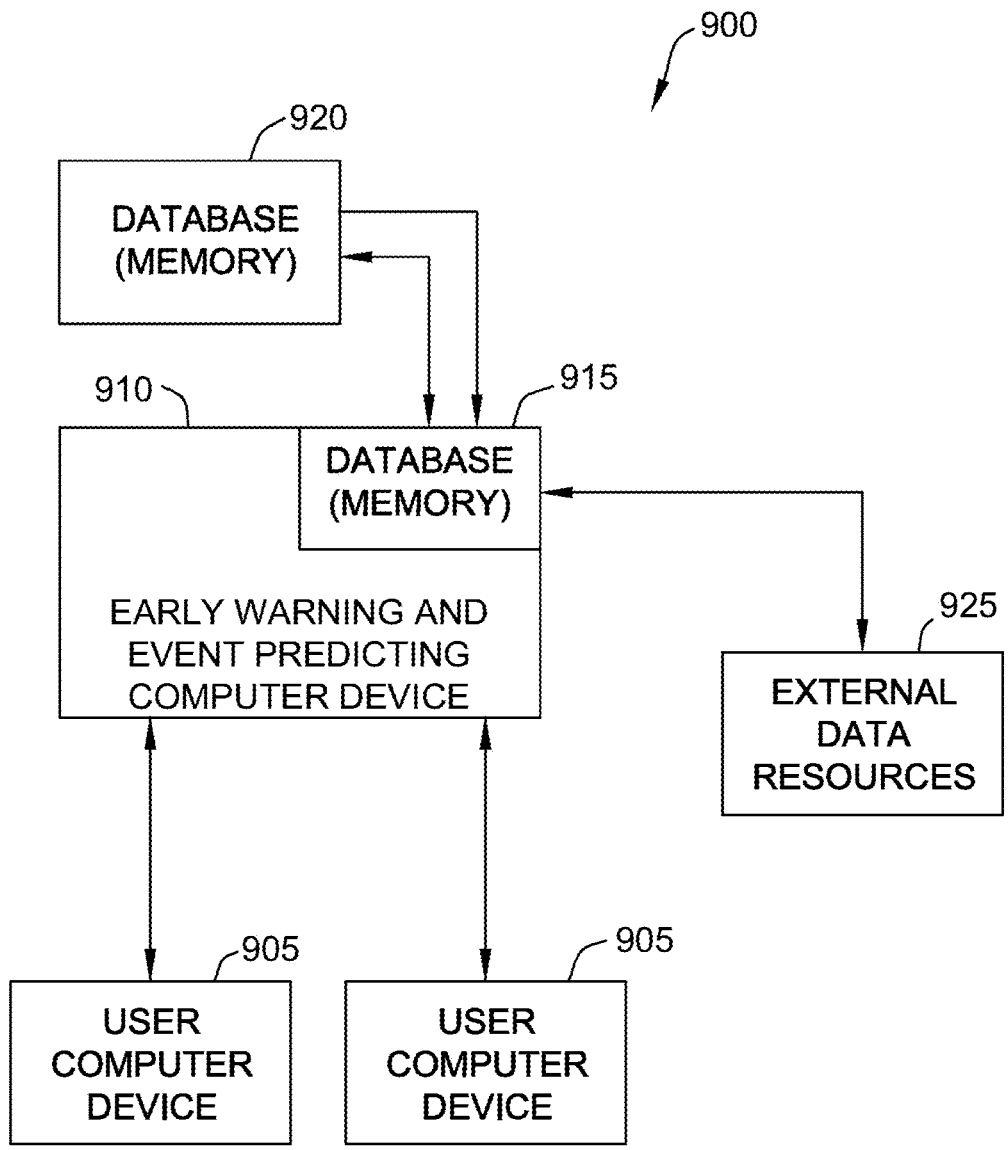
FIG. 9 illustrates a simplified block diagram of an exemplary event warning and predicting system for determining predicting future events for multi-party systems in accordance with one embodiment.

FIG. 9 depicts a simplified block diagram of an exemplary early warning and event predicting (EWEP) system 900 for determining predicting future events for multi-party systems in accordance with one embodiment. In the exemplary embodiment, EWEP system 900 may be used for analyzing data to determine likelihoods of events occurring, frequency that the events may occur, predicted magnitude of the event, and levels of confidence that different events may occur. As described below in more detail, an early warning and event predicting ("EWEP") computer system 910 (also known as an EWEP computer device 910), may be configured to (i) store a plurality of models for predicting a plurality of events, wherein each of the events is associated with one or more of the plurality of models, and wherein each of the plurality of models includes a plurality of variables; (ii) receive a plurality of data from a plurality of sources, wherein a portion of the plurality of data is from real-time sources; (iii) update the plurality of variables for the plurality of models based on the plurality of data; (iv) execute the plurality of models using the plurality of updated variables; and (v) determine a plurality of future events based on the execution of the plurality of models.

In the exemplary embodiment, user computer devices 905 are computers that include a web browser or a software application, which enables user computer devices 905 to access remote computer devices, such as EWEP computer system 910, using the Internet or other network. More specifically, user computer devices 905 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, a cloud connection, and a cable modem. User computer devices 905 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 915 is communicatively coupled to a database 920 that stores data. In one embodiment, database 920 may include raw data, variables, variable weights, event predictions, models, model weights, and user queries, text, reports and preferences. In the exemplary embodiment, database 920 is stored remotely from EWEP computer system 910. In some embodiments, database 920 is decentralized. In the exemplary embodiment, a user, may access database 920 via user computer device 905 by logging onto EWEP computer system 910, as described herein. In other embodiments, a user may directly access the EWEP computer system 910.

In the exemplary embodiments, DMA computer system 910 is also in communication with a plurality of external data sources 925 through which EWEP computer system 910 is able to determine important variables and event predictions. External data resources 925 include, but are not limited to, publicly available databases, governmental databases, social media information and messages, subject matter expert reports and papers, news articles, and any other information necessary to perform the steps described herein.

Figure 10:
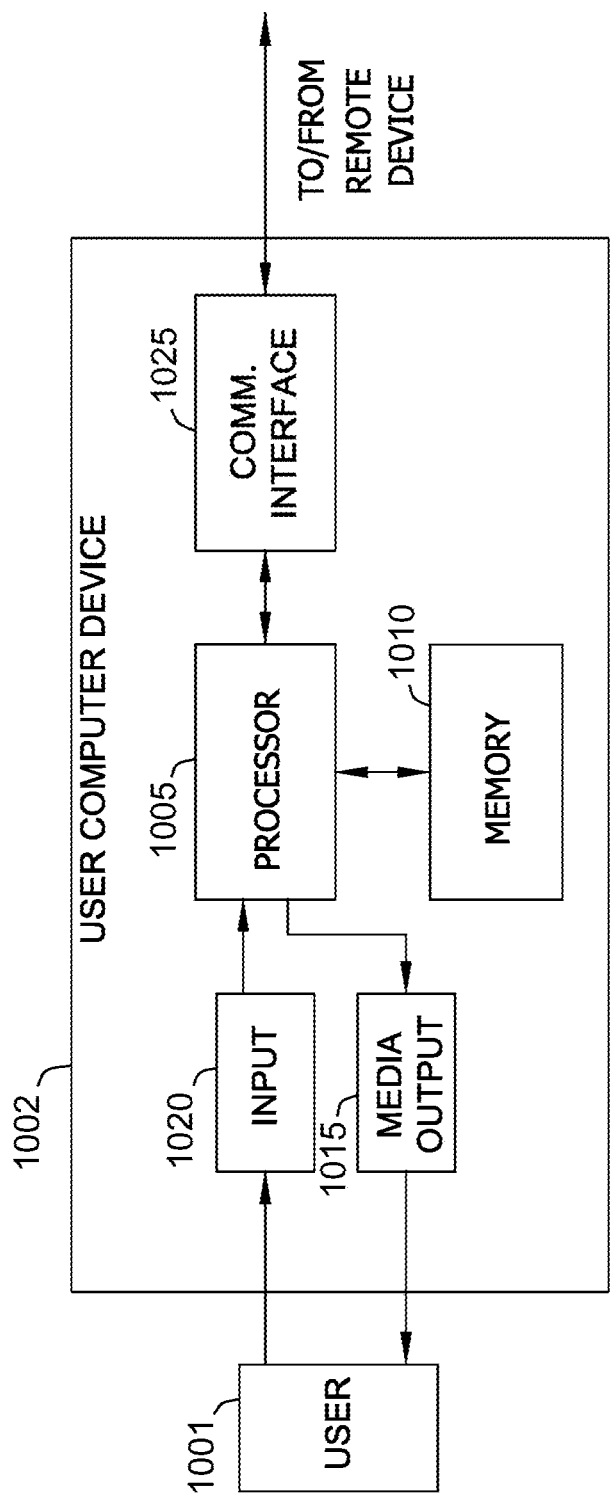
FIG. 10 illustrates an exemplary configuration of a client computer device as shown in FIG. 9, in accordance with one embodiment of the present disclosure.

FIG. 10 depicts an exemplary configuration of client computer device, in accordance with one embodiment of the present disclosure. User computer device 1002 may be operated by a user 1001. User computer device 1002 may include, but is not limited to, user computer device 805 and EWEP computer system 910 (both shown in FIG. 9). In some embodiments, user computer device 1002 is a part of a cloud client server deployment. User computer device 1002 may include a processor 1005 for executing instructions. In some embodiments, executable instructions may be stored in a memory area 1010. Processor 1005 may include one or more processing units (e.g., in a multi-core configuration). Memory area 1010 may be any device allowing information such as executable instructions and/or transaction data to be stored and retrieved. Memory area 1010 may include one or more computer readable media.

User computer device 1002 may also include at least one media output component 1015 for presenting information to user 1001. Media output component 1015 may be any component capable of conveying information to user 1001. In some embodiments, media output component 1015 may include an output adapter (not shown) such as a video adapter and/or an audio adapter. An output adapter may be operatively coupled to processor 1005 and operatively couplable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 1015 may be configured to present a graphical user interface (e.g., a web browser and/or a client application) to user 1001. A graphical user interface may include, for example, an interface for viewing potential events. In some embodiments, user computer device 1002 may include an input device 1020 for receiving input from user 1001. User 1001 may use input device 1020 to, without limitation, to input user preferences. In some embodiments, the graphical user interface is the frontend application 125 (shown in FIG. 1).

Input device 1020 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 1015 and input device 1020. In some embodiments, media output component 1015 and input device 1020 provide augmented or virtual reality interactions to the user 1001. These components 1015 and 1010 may include virtual and augmented reality hardware. For example, the media output component 1015 may be a part of one or more pieces of headgear worn by the user 1001 and the input device may be a wearable device capable of recognizing user gestures for input.

User computer device 1002 may also include a communication interface 1025, communicatively coupled to a remote device such as EWEP computer system 910 or external data resources 925 (shown in FIG. 9). Communication interface 1025 may include, for example, a wired or wireless network adapter and/or a wireless data transceiver for use with a mobile telecommunications network.

Stored in memory area 1010 are, for example, computer readable instructions for providing a user interface to user 1001 via media output component 1015 and, optionally, receiving and processing input from input device 1020. A user interface may include, among other possibilities, a web browser and/or a client application, such as frontend application 125. Web browsers enable users, such as user 1001, to display and interact with media and other information typically embedded on a web page or a website from EWEP computer system 910. A client application may allow user 1001 to interact with, for example, EWEP computer system 910. For example, instructions may be stored by a cloud service, and the output of the execution of the instructions sent to the media output component 1015.

Figure 11:
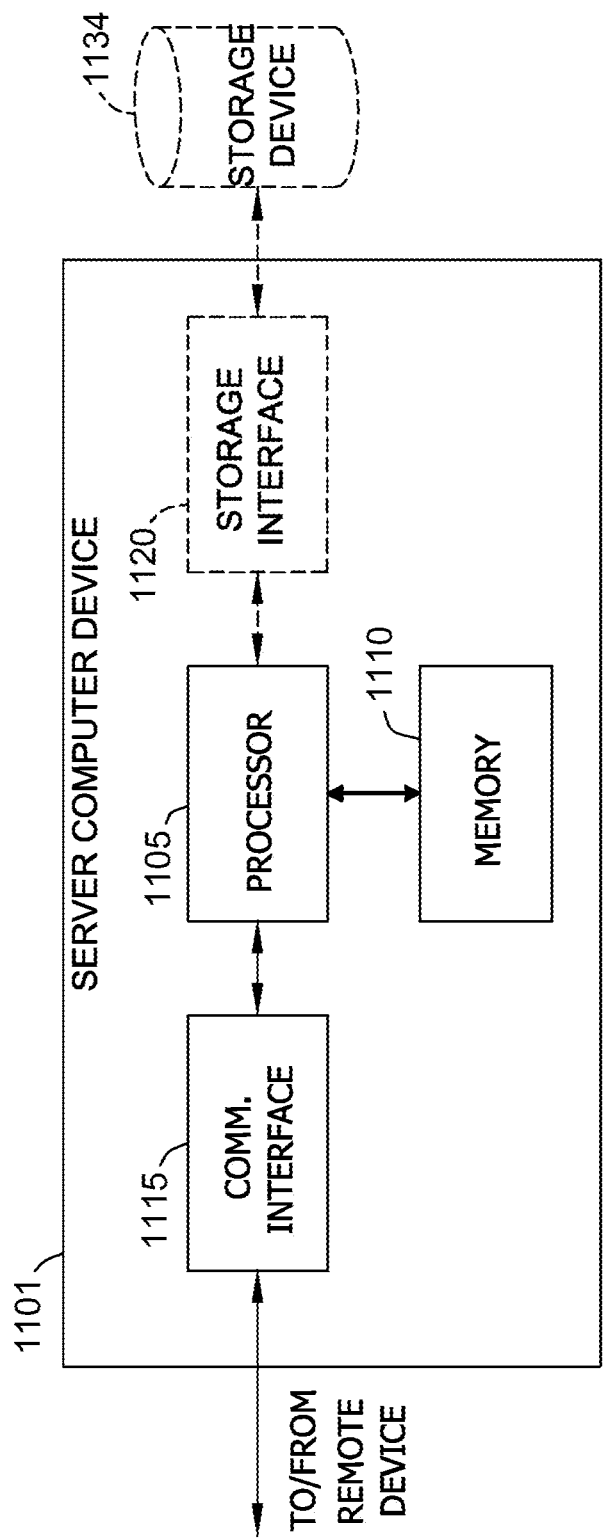
FIG. 11 illustrates an exemplary configuration of a server system as shown in FIG. 9, in accordance with one embodiment of the present disclosure.

FIG. 11 depicts an exemplary configuration of server system, in accordance with one embodiment of the present disclosure. Server computer device 1101 may include, but is not limited to, EWEP computer system 910, database server 915, and external data resources 925 (all shown in FIG. 9). In some embodiments, server computer device 1101 is a part of a cloud client server deployment. Server computer device 1101 may also include a processor 1105 for executing instructions. Instructions may be stored in a memory area 1110. Processor 1105 may include one or more processing units (e.g., in a multi-core configuration).

Processor 1105 may be operatively coupled to a communication interface 1115 such that server computer device 1101 is capable of communicating with a remote device such as another server computer device 1101, EWEP computer system 910, and user computer device 905 (shown in FIG. 9) (for example, using wireless communication or data transmission over one or more radio links or digital communication channels). For example, communication interface 1115 may receive requests from user computer devices 905 via the Internet, as illustrated in FIG. 9.

Processor 1105 may also be operatively coupled to a storage device 1134. Storage device 1134 may be any computer-operated hardware suitable for storing and/or retrieving data, such as, but not limited to, data associated with database 920 (shown in FIG. 9). In some embodiments, storage device 1134 may be integrated in server computer device 1101. For example, server computer device 1101 may include one or more hard disk drives as storage device 1134.

In other embodiments, storage device 1134 may be external to server computer device 1101 and may be accessed by a plurality of server computer devices 1101. For example, storage device 1134 may include a storage area network (SAN), a network attached storage (NAS) system, and/or multiple storage units such as hard disks and/or solid state disks in a redundant array of inexpensive disks (RAID) configuration.

In some embodiments, processor 1105 may be operatively coupled to storage device 1134 via a storage interface 1120. Storage interface 1120 may be any component capable of providing processor 1105 with access to storage device 1134. Storage interface 1120 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1105 with access to storage device 1134.

Processor 1105 may execute computer-executable instructions for implementing aspects of the disclosure. In some embodiments, the processor 1105 may be transformed into a special purpose microprocessor by executing computer-executable instructions or by otherwise being programmed. For example, the processor 1105 may be programmed with the instructions. For example, the processor 1105 may be programmed with the instructions, such as those shown in FIGS. 7 and 8.

Figure 12:
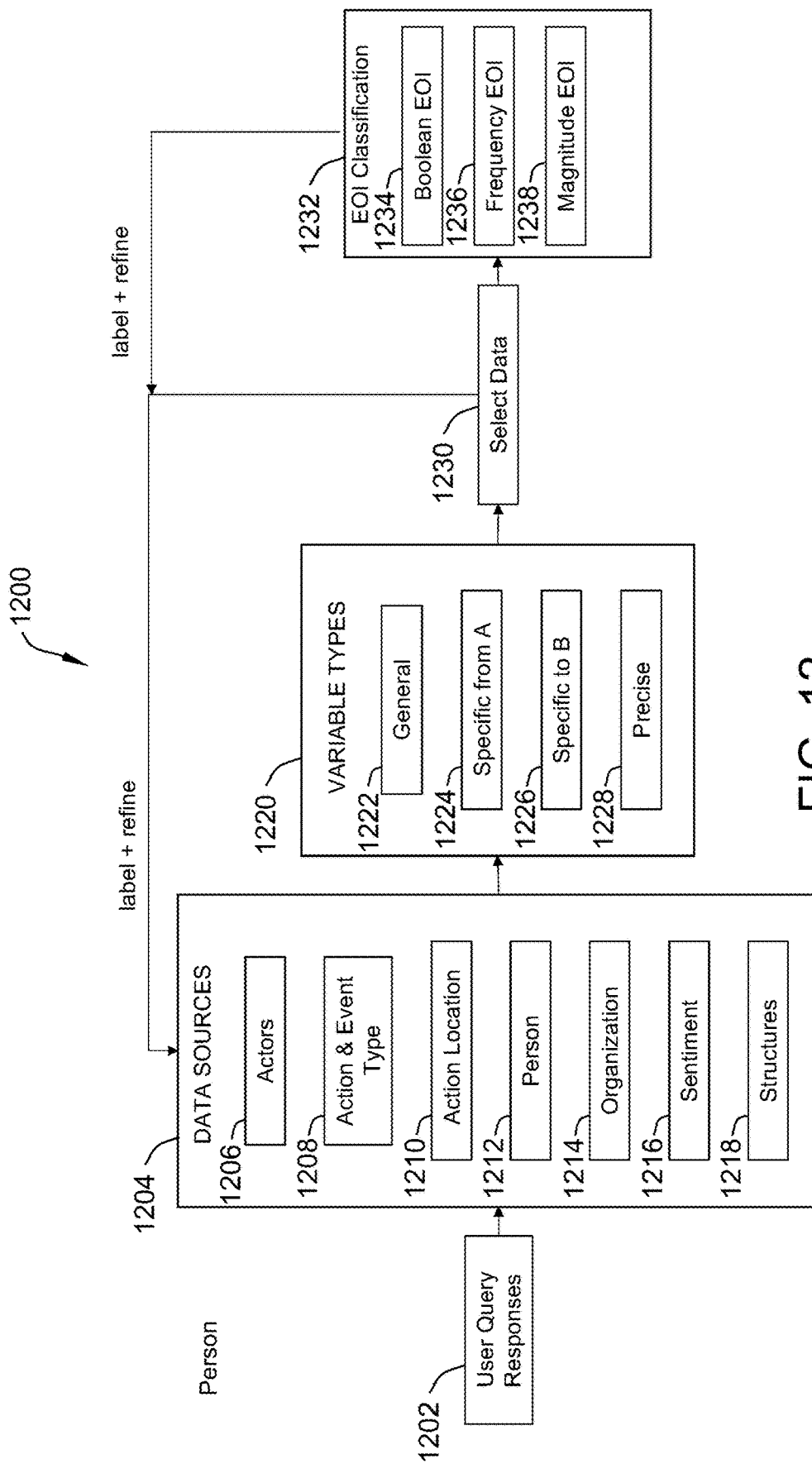
FIG. 12 illustrates an exemplary automatic event of interest (EOI) data creator for determining and refining one or more (EOI) based on user input using the EWEP system shown in FIG. 9.

FIG. 12 illustrates an exemplary automatic event of interest (EOI) data creator 1200 for determining and refining one or more events of interest based on user input using the EWEP system 900 (shown in FIG. 9). The automatic EOI data creator 1200 is configured to determine one or more EOI that the user wishes to track based on user input. The EOI data creator 1200 receives a narrative from a user where the narrative includes 'who does what to/with whom, where, when, why.' The EOI data creator 1200 captures the data, structures the data, and creates the EOI for the user's review. In the exemplary embodiment, the EOI data creator 1200 is a part of the front-end application 125 (shown in FIG. 1) and or the frontend platform app 340 (shown in FIG. 3).

In the exemplary embodiment, the EOI data creator 1200 queries 1202 users to answer structured questions for their unique, customized and exploratory EWEP needs through the API. The EOI data creator 1200 receives a query, such as a natural language query from the user. The EOI data creator 1200 queries 1202 the user to determine and/or refine additional details about the EOIs that are important to the user. In the exemplary embodiment, the EOI data may include, but is not limited to, who does what to/with whom, where, and when. The queries are designed to determine the events, actors, individuals, organizations, and/or locations that are of interest to the user. The queries also assist with determining if the user is interested in events about an actor, events that occur to an actor, events that that actor are driving, or just events in general that are tangentially related to that actor.

In the exemplary embodiment, the EOI data creator 1200 uses the information from the responses to determine the criteria for the EOI. The EOI data creator 1200 searches multiple data sources 1204, such as databases, to determine the different criteria for the EOI. The different criteria can include, but is not limited to, actors 1206, action and event types 1208, action location 1210, person 1212, organizations 1214, sentiment 1216, and structures 1218. For example, the EOI data creator 1200 may analyze a plurality of articles, news sources, and other databases to determine and populate the criteria. The EOI data creator 1200 searches multiple relevant databases using the determined criteria and natural language processing techniques. The actors 1206 may include persons or organizations. The action and event type 1208 represents the event associated with the EOI. The action location 1210 represents where the action or event may occur. This can be as specific as an address and as broad as a country or other geographical region based on the corresponding action type 1208. A person 1212 may be an individual mentioned in the searched article or piece of data. An organization 1214 may also be an organization mentioned in the searched article or piece of data. Sentiment 1216 represents the emotions shown in the article or piece of data. And the structure 1218 may represent the overall discussion in the article or just in a paragraph of the article.

In the exemplary embodiment, the EOI data creator 1200 determines multiple variable types 1220 for the EOI. These variable types 1220 may include, but are not limited to, general events X 1222, specific actor A doing X 1224, specific events X happening to actor B 1226, and precise actor A doing X to/with Actor B 1228. The EOI data creator 1200 selects data 1230 and generates an EOI typology based on how general, specific or precise EOI's can be created given user requests and data availability given certain criteria and thresholds.

In the exemplary embodiment, the EOI data creator 1200 selects an EOI classification 1232 to include either a binary or Boolean EOI occurrence 1234, a frequency of EOI occurrence 1236, or a magnitude of EOI occurrence 1238, based on determined criteria and derived thresholds. In some embodiments, the EOI data creator 1200 determines the EOI classifications 1232 based on the articles that are found in the data sources 1204 associated with variable types 1220. A Boolean EOI occurrence 1234 is determining if an event will happen within a period of time, i.e., if there is an event happening during this week. For example, was there a protest the first week of April? A frequency-based classification 1236 represents if there are multiple events during the week. For example, how many protests were there the first week of April? A magnitude-based classification 1238 represents multiple events and how impactful those events are, for example a protest with five attendees versus a protest with five hundred attendees. These classifications can also be applied to the individual articles to determine if an individual is mentioned in an article (Boolean 1234), how many times the individual is mentioned in the article (Frequency 1236), and how impactful are the mentions in the article (Magnitude 1238). In another example Boolean 1234 ("will there be changes to the regulations this year?"), frequency 1236 ("how many changes to the regulations will there be this year?"), and magnitude 1238 ("many little changes vs. one massive change") classifications can frame the EOI to allow the EWEP system 900 to determine the models and variables needed to predict the corresponding event(s).

Then the EOI data creator 1200 presents users with one or more proposed EOIs. The user may then select the desired EOI or provide more details. Based on the user's selection, the EWEP system 900 proceeds to analyzing data to detect if and when the EOI may occur through processes show herein, such as, but not limited to process 600 (shown in FIG. 6). In some embodiments, the user can update their selections in the previous response. In some further embodiments, the EOI data creator 1200 presents the user with one or more articles associated with the EOI. The user can then determine if the articles are good or bad representations of the user's desired EOI. Based on that feedback, the EOI data creator 1200 can update its creation of the EOI. For example, the EOI may be related to new sports cars for the next year. The EOI data creator 1200 may present multiple articles on different new sports cars for the new year. The user may then review those articles to see which they prefer. For example, the user may prefer a longer, detailed article from a sports car enthusiast magazine rather than a high-level article from a newspaper. The user may rate each of the articles, either with a yes/no or a numbered ranking. The EOI data creator 1200 and the machine learning may learn the preferences of the individual user as well as the best type of information or data to present based on the attributes of the articles presented and the ratings of those articles.

In another example, the EOI data creator 1200 the query may relate to multiple different actors. For example, the user may ask how the cardinals are doing this year. This may refer to sports teams for different sports and at different locations. This query may also be a question about bird populations. The EOI data creator 1200 may present articles related to these different versions to the user to determine which is correct. The EOI data creator 1200 may also determine there are multiple different topics related to cardinals and try to narrow the EOI by asking questions to the user in the user query responses 1202.

Furthermore, the EOI data creator 1200 uses machine learning techniques to refine criteria, data collection, and EOI exploration and validity of the steps above until certain validity thresholds are achieved to output the final EOI to be collected, mapped, tracked and forecasted in EWEP system 900. Furthermore, the EOI data creator 1200 may use the feedback from the user about the presented articles and/or the presented EOI to refine the analysis algorithms of the EOI data creator 1200.

In some embodiments, the EOI data creator 1200 may complete the analysis shown in FIG. 12 multiple times before determining the final EOI for the user. In these embodiments, the EOI data creator 1200 provides the user with multiple EOIs with associated data to determine which the user desires to be analyzed. The user may disagree with the provided EOIs and/or provide additional data to clarify the EOI. Then the EOI data creator 1200 repeats the analysis with the data sources 1204, variable types 1220, data selection 1230, and EOI classification 1232. And provides the user with updated EOIs. The cycle may repeat several times before the user finally selects an EOI. In these embodiments, the EOI data creator 1200 may be in communication with one or more machine learning algorithm and processes to provide improved EOI analysis based on user input.

Figure 13:
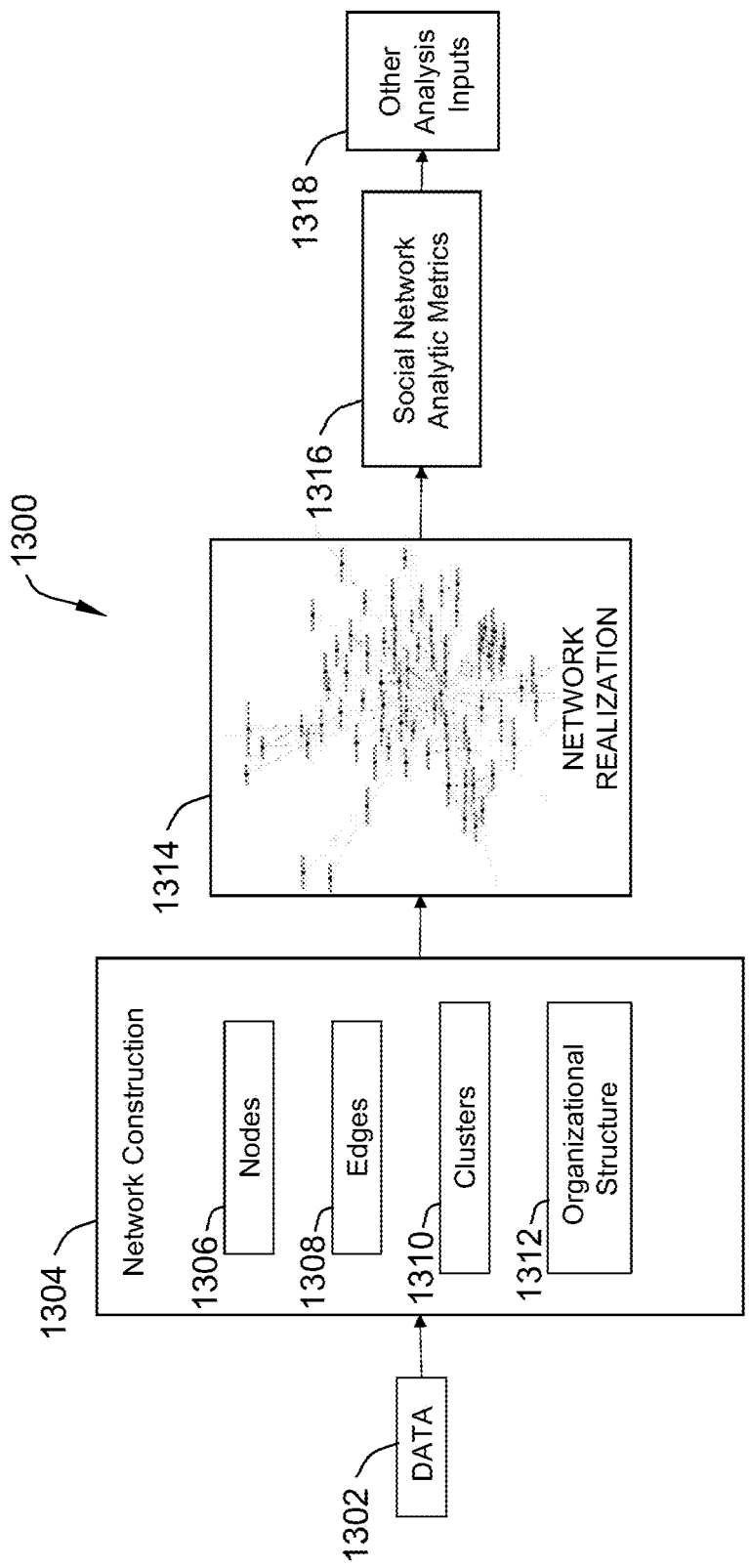
FIG. 13 illustrates an exemplary real time actor network mapping system for analyzing EOIs such as those provided by the EOI data creator using the EWEP system.

FIG. 13 illustrates an exemplary real time actor network mapping system 1300 for analyzing EOIs such as those provided by the EOI data creator 1200 (shown in FIG. 12) using the EWEP system 900 (shown in FIG. 9). The real time actor network mapping system 1300 analyzes a plurality of data to detect information associated with the EOI and retrieves inputs for other processes in the analysis described herein, such as process 500 (shown in FIG. 5). In the exemplary embodiment, the real time actor network mapping system 1300 is a part of data extraction & transformation 310 (shown in FIG. 3).

In the exemplary embodiment, the real time actor network mapping system 1300 may be configured to receive data 1302 from a plurality of data sources. The real time actor network mapping system 1300 pre-screens the data and the relevant sources to identify data 1302 and articles that are related to the EOI.

In the exemplary embodiment, real time actor network mapping system 1300 performs NLP and other web scraping techniques on the data 1302 to identify persons, groups, and organizations based on various similarity thresholds. The real time actor network mapping system 1300 identifies nodes 1306, edges 1308, clusters 1310, and organizational structure 1312 from the data 1302. The real time actor network mapping system 1300 creates graph networks of actors, group clusters and the general network typology. The real time actor network mapping system 1300 combines the graphs of networks into a network realization 1314. The network realization 1314 maps the actors (or stakeholders) into a network based on connections between the actors as shown in the data 1302. For example, if two actors are shown to be listed in the same article or piece of data, a connection is shown between the two. The strength of the connection may be based on how close the two actors are listed in the article and how many times each is listed among other methods. An individual actor may be multiple connections depending on how many articles or pieces of data that they appear in and how many others they appear with in those mentions.

The real time actor network mapping system 1300 performs additional analysis, such as social network analytic metrics 1316 and other analysis inputs 1318, such as, but not limited to, real-time stakeholder mapping.

The real time actor network mapping system 1300 defines various network analysis variables and features used in process 500, such as Data source 505, Data Extraction & Transformation 510, and Data Integration 515 (all shown in FIG. 5). In some embodiments, the outputs from the real time actor network mapping system 1300 may become inputs to other analytical models.

In the exemplary embodiment, the EWEP computer device 910 stores a plurality of models 210 associated with a plurality of future events. The EWEP computer device 910 receives a user query. The user query may be for a specific event, for events that happen to an actor, for events that are caused by an actor, or just general events associated with the actor. The EWEP computer device 910 receives a plurality of data from a plurality of data sources 925. The EWEP computer device 910 preprocesses the plurality of data to remove noise and populate the plurality of models 210 with the plurality of data. The EWEP computer device 910 determines a subset of models, such as ensemble stage 2 230 (shown in FIG. 2) of the plurality of models 210 to execute based on the user query. The EWEP computer device 910 executes the subset of models to receive a plurality of results. The EWEP computer device 910 ensembles the plurality of results from the subset of models to determine a combination model 215. The EWEP computer device 910 executes the combination model 215 to forecast at least one future event 220 based on the user query. In some embodiments, the forecast of the at least one future event includes at least one of a predictive probability, a frequency, a magnitude, and a confidence level. In some further embodiments, the at least one future event includes a probability of the at least one future event occurring within a specific period of time and a confidence level associated with the probability. The at least one future event includes a report detailing actors, event type, a geolocation, and causes associated with the at least one future event.

In some embodiments, to preprocess the plurality of data the EWEP computer device 910 selects variables for the plurality of models 210 based on weights and past performance of the variables. The EWEP computer device 910 ensembles the plurality of results by blending the results of individual models in a plurality of stages. The EWEP computer device 910 determines a subset of models of the plurality of models 210 to execute based on the user query based on historical performance of each of the plurality of models in past queries.

In some further embodiments, the EWEP computer device 910 receives a plurality of updated data and preprocesses the plurality of updated data an populate the subset of models to execute. The EWEP computer device 910 executes the subset of models to receive an updated plurality of results. The EWEP computer device 910 ensembles the updated plurality of results from the subset of models to determine an updated combination model. The EWEP computer device 910 executes the updated combination model to update the forecast at least one future event based on the user query.

In some embodiments, the plurality of models may include macro models, meso models, and micro models. The plurality of models may include one or more of macro structures, meso events of interest, meso networks, meso emotions, or micro actors. The plurality of models may each contain one or more of macro variables, meso variable, and micro variables. The plurality of models may further include one or more mixed models containing two or more of macro variables, meso variables, and micro variables. The plurality of data sources may include structured and unstructured data. The structured data may include country and other geo-political entity data and statistics and data provided by a user. The unstructured data may include text sources, video/audio broadcasting, data from news sites, social media, blogs, various Internet sites, and web scraped data.

In some embodiments, the EWEP computer device 910 receives one or more real-time events. The EWEP computer device 910 compares the one or more real-time events to the at least one future event. And the EWEP computer device 910 adjusts at least one model of the subset of models based on the comparison.

In still further embodiments, the EWEP computer device 910 determines sentiment based on the plurality of data. The EWEP computer device 910 presents the sentiment associated with the at least one future event.

To preprocess the plurality of data the EWEP computer device 910 performs preprocessing on the plurality of data to determine if there is any missing data, replace missing data, identify data outliers, perform data smoothing, and perform a ground truthing on the plurality of data.

In some further embodiments, the EWEP computer device 910 receives a query about an event from a user. The EWEP computer device 910 executes the plurality of models associated with the event to determine a predictive probability of the event occurring. The EWEP computer device 910 determines a likelihood of the event occurring based on the predictive probability and a confidence level based on the likelihood. The EWEP computer device 910 provides, to the user, the likelihood of the event occurring and the confidence level. The EWEP computer device 910 receives a natural language query from a user. The EWEP computer device 910 requests one or more clarifications from the user based on the natural language query. The EWEP computer device 910 analyzes the plurality of data sources to determine a plurality of actors, event types, and event locations associated with the natural language query and the one or more clarifications. The EWEP computer device 910 determines a plurality of data objects associated with the natural language query based on the determined plurality of actors, event types, and event locations. The EWEP computer device 910 presents the plurality of data objects to the user for rating. The EWEP computer device 910 determines an event of interest based on the ratings for the plurality of data objects.

The EWEP computer device 910 receives the ratings for the plurality of data objects from the user. The EWEP computer device 910 reanalyzes the plurality of data sources to update the plurality of actors, event types, and event locations associated with the natural language query, the one or more clarifications, and the ratings. The EWEP computer device 910 determines an updated plurality of data objects associated with the natural language query based on the updated plurality of actors, event types, and event locations. The EWEP computer device 910 presents the updated plurality of data objects to the user for rating. The EWEP computer device 910 generates a network by comparing connections links between actors within the plurality of data At least one of the technical solutions to the technical problems provided by this system may include: (i) improved speed and accuracy for predicting the occurrence of future events; (ii) reduce the number of variables needed to be analyzed for predicting future events; (iii) improved detection of the potential for future events based on current and historical data; (iv) customizable event detection; and (v) continuously updating models for events to improve accuracy and speed of analysis.

The methods and systems described herein may be implemented using computer programming or engineering techniques including computer software, firmware, hardware, or any combination or subset thereof, wherein the technical effects may be achieved by performing at least one of the following steps: (a) receive a plurality of data from a plurality of sources; (b) identify and analyze the plurality of data; (c) parse the plurality of data into a plurality of categories, where the plurality of data is stored based on the corresponding category of the plurality of categories, and where the plurality of categories include a micro category, a macro category, and a meso category; (d) integrate the plurality of data into the plurality of models, where the plurality of models are also parsed into the plurality of categories; (e) integrate the plurality of data into a plurality of variables associated with the plurality of models, where each variable of the plurality of variables is associated with a weight that is also associated with the use of that variable in a model of the plurality of models; (f) execute a plurality of models to predict a plurality of predictive probabilities for a plurality of future events based on the plurality of data; and (g) determine at least one future event based on the plurality of predictive probabilities and the plurality of future events.

The technical effects may also be achieved by performing at least one of the following steps: (a) analyze the plurality of predictive probabilities, frequencies, and/or magnitudes to determine an adjusted weight for at least one of the plurality of weights; (b) analyze one or more past events to determine an adjusted weight for at least one of the plurality of weights; (c) determine one or more variables of the plurality of variables that the user may affect; (d) receive an update to the one or more variables from the user; (e) execute the plurality of models based on the updated one or more variables; (f) provide the user with one or more differences based on the execution of the plurality of models with the updated one or more variables; (g) analyze one or more past events to determine an adjusted weight associated with a model of the plurality of models, where each model of the plurality of models is associated with a weight, and where the weight is further associated with a type of event; (h) execute an ensemble learning model to blend the plurality of predictive probabilities for an event to determine a final predictive probability, frequency, and/or magnitude for the event (i) receive a query about an event from a user; (j) execute the plurality of models associated with the event to determine an predictive probability of the event occurring; (k) determining a likelihood of the event occurring based on the predictive probability and a confidence level based on the likelihood; (l) provide, to the user, the likelihood of the event occurring and the confidence level; and (m) provide the user with additional information associated with the event occurring based on the plurality of data.

The technical effects may also be achieved by performing at least one of the following steps: (a) receive one or more user preferences from a user; (b) filter the plurality of future events based on the one or more user preferences; and (c) determine the at least one future event based on the plurality of predictive probabilities and the filtered plurality of future events; (d) perform preprocessing on the plurality of data to determine if there is any missing data, replace missing data, identify data outliers, perform data smoothing, and perform a sanity check on the plurality of data; (e) determine a first plurality of additional variables for the plurality of models; (f) analyze the first plurality of additional variables to reduce to a second plurality of additional variables; (g) determine an importance for each of the second plurality of additional variables based on the plurality of models; (h) update at least one of the plurality of models based on the second plurality of variables; (i) receive an additional plurality of data from a plurality of sources on a periodic basis; and (j) execute the plurality of models based on the plurality of additional data.

The methods and systems described herein may be implemented using computer programming or engineering techniques including computer software, firmware, hardware, or any combination or subset thereof, wherein the technical effects may be achieved by performing at least one of the following steps: (a) store a plurality of models associated with a plurality of future events; (b) receive a user query; (c) receive a plurality of data from a plurality of data sources, wherein the plurality of data sources include structured and unstructured data, wherein the structured data includes country and other geo-political entity data and statistics and data provided by a user, and wherein unstructured data includes text sources, video/audio broadcasting, data from news sites, social media, blogs, various Internet sites, and web scraped data; (d) preprocess the plurality of data to remove noise and populate the plurality of models with the plurality of data, wherein to preprocess the plurality of data the at least one processor further programmed to select variables for the plurality of models based on weights and past performance of the variables, wherein the plurality of models include macro models, meso models, and micro models, wherein the plurality of models each contain one or more of macro variables, meso variable, and micro variables, wherein the plurality of models further include one or more mixed models containing two or more of macro variables, meso variables, and micro variables; (e) determine a subset of models of the plurality of models to execute based on the user query; (f) execute the subset of models to receive a plurality of results; (g) ensemble the plurality of results from the subset of models to determine a combination model; (h) execute the combination model to forecast at least one future event based on the user query, wherein the forecast of the at least one future event includes at least one of a predictive probability, a frequency, a magnitude, and a confidence level, wherein the at least one future event includes a probability of the at least one future event occurring within a specific period of time and a confidence level associated with the probability, wherein the at least one future event includes a report detailing actors, event type, a geolocation, and causes associated with the at least one future event; (i) ensemble the plurality of results by blending the results of individual models in a plurality of stages; (j) determine a subset of models of the plurality of models to execute based on the user query based on historical performance of each of the plurality of models in past queries; (k) receive a plurality of updated data; (l) preprocess the plurality of updated data an populate the subset of models to execute; (m) execute the subset of models to receive an updated plurality of results; (n) ensemble the updated plurality of results from the subset of models to determine an updated combination model; (o) execute the updated combination model to update the forecast at least one future event based on the user query; (p) receive one or more real-time events; (q) compare the one or more real-time events to the at least one future event; (r) adjust at least one model of the subset of models based on the comparison; (s) determine sentiment based on the plurality of data; (t) present the sentiment associated with the at least one future event; (u) perform preprocessing on the plurality of data to determine if there is any missing data, replace missing data, identify data outliers, perform data smoothing, and perform a ground truthing on the plurality of data; (v) receive a query about an event from a user; (w) execute the plurality of models associated with the event to determine a predictive probability of the event occurring; (x) determine a likelihood of the event occurring based on the predictive probability and a confidence level based on the likelihood; and (y) provide, to the user, the likelihood of the event occurring and the confidence level.

The technical effects may also be achieved by performing at least one of the following steps: (a) receive a natural language query from a user; (b) request one or more clarifications from the user based on the natural language query; (c) analyze the plurality of data sources to determine a plurality of actors, event types, and event locations associated with the natural language query and the one or more clarifications; (d) determine a plurality of data objects associated with the natural language query based on the determined plurality of actors, event types, and event locations; (e) present the plurality of data objects to the user for rating; (f) determine an event of interest based on the ratings for the plurality of data objects (g) receive the ratings for the plurality of data objects from the user; (h) reanalyze the plurality of data sources to update the plurality of actors, event types, and event locations associated with the natural language query, the one or more clarifications, and the ratings; (i) determine an updated plurality of data objects associated with the natural language query based on the updated plurality of actors, event types, and event locations; (j) present the updated plurality of data objects to the user for rating; (k) generate a network by comparing connections links between actors within the plurality of data.

Machine Learning & Other Matters

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

In some embodiments, the design system is configured to implement machine learning, such that the neural network "learns" to analyze, organize, and/or process data without being explicitly programmed. Machine learning may be implemented through machine learning (ML) methods and algorithms. In an exemplary embodiment, a machine learning (ML) module is configured to implement ML methods and algorithms. In some embodiments, ML methods and algorithms are applied to data inputs and generate machine learning (ML) outputs. Data inputs may include but are not limited to: analog and digital signals (e.g. sound, light, motion, natural phenomena, etc.) Data inputs may further include: sensor data, image data, video data, and telematics data. ML outputs may include but are not limited to: digital signals (e.g. information data converted from natural phenomena). ML outputs may further include: speech recognition, image or video recognition, medical diagnoses, statistical or financial models, autonomous vehicle decision-making models, robotics behavior modeling, fraud detection analysis, user input recommendations and personalization, game AI, skill acquisition, targeted marketing, big data visualization, weather forecasting, and/or information extracted about a computer device, a user, a home, a vehicle, or a party of a transaction. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, recurrent neural networks, Monte Carlo search trees, generative adversarial networks, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, ML methods and algorithms are directed toward supervised learning, which involves identifying patterns in existing data to make predictions about subsequently received data. Specifically, ML methods and algorithms directed toward supervised learning are "trained" through training data, which includes example inputs and associated example outputs. Based on the training data, the ML methods and algorithms may generate a predictive function which maps outputs to inputs and utilize the predictive function to generate ML outputs based on data inputs. The example inputs and example outputs of the training data may include any of the data inputs or ML outputs described above. For example, a ML module may receive training data comprising data associated with events that occurred, generate a model which maps the data preceding the event to data about when and where the event occurred, and generate predictions of when that event may occur again in the future based on current data.

In another embodiment, ML methods and algorithms are directed toward unsupervised learning, which involves finding meaningful relationships in unorganized data. Unlike supervised learning, unsupervised learning does not involve user-initiated training based on example inputs with associated outputs. Rather, in unsupervised learning, unlabeled data, which may be any combination of data inputs and/or ML outputs as described above, is organized according to an algorithm-determined relationship. In an exemplary embodiment, a ML module coupled to or in communication with the design system or integrated as a component of the design system receives unlabeled data comprising event data, financial data, social data, geographic data, cultural data, and political data, and the ML module employs an unsupervised learning method such as "clustering" to identify patterns and organize the unlabeled data into meaningful groups. The newly organized data may be used, for example, to extract further information about the potential events.

In yet another embodiment, ML methods and algorithms are directed toward reinforcement learning, which involves optimizing outputs based on feedback from a reward signal. Specifically ML methods and algorithms directed toward reinforcement learning may receive a user-defined reward signal definition, receive a data input, utilize a decision-making model to generate a ML output based on the data input, receive a reward signal based on the reward signal definition and the ML output, and alter the decision-making model so as to receive a stronger reward signal for subsequently generated ML outputs. The reward signal definition may be based on any of the data inputs or ML outputs described above. In an exemplary embodiment, a ML module implements reinforcement learning in a user recommendation application. The ML module may utilize a decision-making model to generate a ranked list of options based on user information received from the user and may further receive selection data based on a user selection of one of the ranked options. A reward signal may be generated based on comparing the selection data to the ranking of the selected option. The ML module may update the decision-making model such that subsequently generated rankings more accurately predict optimal constraints.

In some embodiments, the ML module may determine that using one or more variables in one or more models are unnecessary in future iterations due to a lack of results or importance. Accordingly, the ML module instructs the EWEP computer system 910 (shown in FIG. 9) to not extract or use those variables while processing those models in future rounds, thereby saving time and processing power. Furthermore, the ML module may recognize patterns and be able to apply those patterns when executing models to improve the efficiency of that process and reduce processing resources. In some embodiments, ML modules may be executed on ML training computational units customized for ML training. For example, in some embodiments, tensor processing units (TPUs) may be used for ML training.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. In some embodiments, graphics processing unit (GPU) based RDBMS may be used to boost DB performance. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously as well as in memory streaming analytics.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An early warning and event monitoring computer device for predicting events, the computer device comprising at least one processor in communication with at least one memory device, the at least one processor programmed to:
   store a plurality of models associated with a plurality of future events, wherein the plurality of models include macro variables, meso variables, and micro variables, wherein the micro variables relate to actor specific data, wherein the meso variables relate to network structures between actors, and wherein the macro variables relate to structural political, military, economic, and social factors that encompass all events;
   receive a user query;
   receive a plurality of data from a plurality of data sources;
   preprocess the plurality of data to remove noise and populate the plurality of models with the plurality of data;
   determine a subset of models of the plurality of models to execute based on the user query;
   execute the subset of models to receive a plurality of results;
   ensemble the plurality of results from the subset of models to determine a combination model by blending the results of individual models in a plurality of stages that automatically performs model hyperparameter identification and tuning to achieve the highest accuracy dynamically;
   execute the combination model to forecast at least one future event based on the user query, wherein the at least one future event includes a probability, frequency, and magnitude of the at least one future event occurring within a specific period of time and a confidence level associated with the probability, the frequency, and the magnitude; and
   execute the combination model and present to a user a subset of variables capable of increasing or decreasing predictive probabilities, frequencies, and magnitudes based on a change in one or more of the subset of variables.

2. The computer device in accordance with claim 1, wherein the forecast of the at least one future event includes at least one of a predictive probability, a frequency, a magnitude, and a confidence level.

3. The computer device in accordance with claim 1, wherein the at least one future event includes a report detailing actors, event type, a geolocation, and causes associated with the at least one future event.

4. The computer device in accordance with claim 1, wherein to preprocess the plurality of data the at least one processor further programmed to select variables for the plurality of models based on weights and past performance of the variables.

5. The computer device in accordance with claim 1, wherein the at least one processor further programmed to determine a subset of models of the plurality of models to execute based on the user query based on historical performance of each of the plurality of models in past queries depending on complex adaptive systems, macro, meso, and micro models, and their unique inter-relationships.

6. The computer device in accordance with claim 1, wherein the at least one processor further programmed to:
receive a plurality of updated data;
preprocess the plurality of updated data an populate the subset of models to execute;
execute the subset of models to receive an updated plurality of results;
ensemble the updated plurality of results from the subset of models to determine an updated combination model;
execute the updated combination model to update the forecast at least one future event based on the user query; and
predictively analyze results to visualize one or more actors, events, sentiments, or key variables that are critical to support.

7. The computer device in accordance with claim 1, wherein the plurality of models include macro models, meso models, and micro models.

8. The computer device in accordance with claim 7, wherein the plurality of models include one or more of macro structures, meso events of interest, meso networks, meso emotions, or micro actors.

9. The computer device in accordance with claim 1, wherein the at least one processor is further programmed to automatically determine an appropriate combination of micro variables, meso variables, and macro variables that matches the predictive probabilities, frequencies, and magnitudes.

10. The computer device in accordance with claim 1, wherein the plurality of models further include one or more mixed models containing two or more of macro variables, meso variables, and micro variables based on complex adaptive systems methodologies.

11. The computer device in accordance with claim 1, wherein the plurality of data sources include structured and unstructured data, wherein the structured data includes country and other geo-political entity data and statistics and data provided by a user, and wherein unstructured data includes text sources, video/audio broadcasting, data from news sites, social media, blogs, various Internet sites, and web scraped data.

12. The computer device in accordance with claim 1, wherein the at least one processor is further programmed to:
receive one or more real-time events;
compare the one or more real-time events to the at least one future event; and
adjust at least one model of the subset of models based on the comparison.

13. The computer device in accordance with claim 1, wherein the at least one processor is further programmed to:
determine sentiment based on the plurality of data; and
present the sentiment associated with the at least one future event.

14. The computer device in accordance with claim 1, wherein to preprocess the plurality of data the at least one processor is further programmed to perform preprocessing on the plurality of data to determine if there is any missing data, replace missing data, identify data outliers, perform data smoothing, and perform a ground truthing on the plurality of data.

15. The computer device in accordance with claim 1, wherein the at least one processor is further programmed to:
receive a query about an event from a user;
execute the plurality of models associated with the event to determine a predictive probability, frequency, or magnitude of the event occurring;
determine a likelihood of the event occurring based on the predictive probability, frequency, or magnitude and a confidence level based on the likelihood; and
provide, to the user, the likelihood of the event occurring and the confidence level.

16. A method for predicting events, the method implemented by a computer device comprising at least one processor in communication with at least one memory device, the method comprising:
storing a plurality of models associated with a plurality of future events, wherein the plurality of models include macro variables, meso variables, and micro variables, wherein the micro variables relate to actor specific data, wherein the meso variables relate to network structures between actors, and wherein the macro variables relate to structural political, military, economic, and social factors that encompass all events;
receiving a user query;
receiving a plurality of data from a plurality of data sources;
preprocessing the plurality of data to remove noise and populate the plurality of models with the plurality of data;
determining a subset of models of the plurality of models to execute based on the user query;
executing the subset of models to receive a plurality of results;
ensembling the plurality of results from the subset of models to determine a combination model by blending the results of individual models in a plurality of stages that automatically performs model hyperparameter identification and tuning to achieve the highest accuracy dynamically;
executing the combination model to forecast at least one future event based on the user query, wherein the at least one future event includes a probability, frequency, and magnitude of the at least one future event occurring within a specific period of time and a confidence level associated with the probability, the frequency, and the magnitude; and
executing the combination model and presenting to a user a subset of variables capable of increasing or decreasing predictive probabilities, frequencies, and magnitudes based on a change in one or more of the subset of variables.

17. The method in accordance with claim 16, wherein the at least one future event includes a report detailing actors, event type, a geolocation, and causes associated with the at least one future event.

18. The method in accordance with claim 16 further comprising:
- preprocessing the plurality of data select variables for the plurality of models based on weights and past performance of the variables;
- determining a subset of models of the plurality of models to execute based on the user query based on historical performance of each of the plurality of models in past queries depending on complex adaptive systems, macro, meso, and micro models, and their unique inter-relationships.

19. The method with claim 16 further comprising:
- receiving a plurality of updated data;
- preprocessing the plurality of updated data an populate the subset of models to execute;
- executing the subset of models to receive an updated plurality of results;
- ensembling the updated plurality of results from the subset of models to determine an updated combination model;
- executing the updated combination model to update the forecast at least one future event based on the user query; and
- predictively analyzing results to visualize one or more actors, events, sentiments, or key variables that are critical to support.

* * * * *

UNITED STATES PATENT AND TRADEMARK OFFICE
CERTIFICATE OF CORRECTION

| | |
|---|---|
| PATENT NO. | : 11,392,847 B1 |
| APPLICATION NO. | : 17/229297 |
| DATED | : July 19, 2022 |
| INVENTOR(S) | : Mark Abdollahian et al. |

It is certified that error appears in the above-identified patent and that said Letters Patent is hereby corrected as shown below:

On the Title Page

Item (72) Inventors should read:
Mark Abdollahian, Altadena, CA (US); Zhengming Song, Houston, TX (US); Domrongphol Sangmanee, Bangkok (TH); Khaled Eid, Claremont, CA (US); Yadong Ruan, Upland, CA (US); Qiao Yang, Upland, CA (US); Yanbiao Chen, Upland, CA (US); Linfeng Li, Pomona, CA (US); Qiyun Li, Montclair, CA (US); Jacek Kugler, Claremont, CA (US); Zhamilia Klycheva, Claremont, CA (US); Feifan Chen, Chino, CA (US); Sippanon Kitimoon, Pomona, CA (US); Theeraphat Pothisawang, Pomona, CA (US)

Signed and Sealed this
Sixteenth Day of July, 2024

Katherine Kelly Vidal
*Director of the United States Patent and Trademark Office*